(12) United States Patent
Han et al.

(10) Patent No.: US 10,736,130 B2
(45) Date of Patent: Aug. 4, 2020

(54) METHOD AND DEVICE FOR UPLINK CONTROL SIGNAL TRANSMISSION, USER TERMINAL, AND STORAGE MEDIUM

(71) Applicant: ZTE CORPORATION, Shenzhen (CN)

(72) Inventors: Xianghui Han, Shenzhen (CN); Shuqiang Xia, Shenzhen (CN); Wen Zhang, Shenzhen (CN); Jing Shi, Shenzhen (CN); Min Ren, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 29 days.

(21) Appl. No.: 16/089,060

(22) PCT Filed: Mar. 24, 2017

(86) PCT No.: PCT/CN2017/078212
§ 371 (c)(1),
(2) Date: Sep. 27, 2018

(87) PCT Pub. No.: WO2017/167139
PCT Pub. Date: Oct. 5, 2017

(65) Prior Publication Data
US 2019/0132859 A1 May 2, 2019

(30) Foreign Application Priority Data

Mar. 31, 2016 (CN) .......................... 2016 1 0206116

(51) Int. Cl.
*H04W 72/12* (2009.01)
*H04L 27/26* (2006.01)
(Continued)

(52) U.S. Cl.
CPC ....... *H04W 72/1284* (2013.01); *H04L 5/0055* (2013.01); *H04L 27/2611* (2013.01); *H04W 72/0446* (2013.01); *H04L 5/0007* (2013.01)

(58) Field of Classification Search
CPC . H04L 5/0055; H04L 5/0007; H04W 72/0446
See application file for complete search history.

(56) References Cited

U.S. PATENT DOCUMENTS 7,852,883 B2 12/2010 Kwak
8,416,815 B2 4/2013 Kwak
(Continued)

FOREIGN PATENT DOCUMENTS

CN 101369965 A 2/2009
CN 101682414 A 3/2010
(Continued)

OTHER PUBLICATIONS

International search report in international application No. PCT/CN2017/078212, dated Jun. 30, 2017, 2 pgs.
(Continued)

*Primary Examiner* — Fahmida S Chowdhury
(74) *Attorney, Agent, or Firm* — Cantor Colburn LLP

(57) ABSTRACT

Disclosed are a method and device for uplink control signal transmission, a user terminal and a storage medium. The method includes: sending, by the user terminal, K predefined sequences on M transmission symbols in a Transmission Time Interval (TTI) to transmit B-bit uplink control information, wherein M is a positive integer, K is an integer, $1 \leq K \leq 2^B$, the B is an integer greater than or equal to 1, one of the K predefined sequences is sent on each of the M transmission symbols, the predefined sequences have a length of N and are mapped to N subcarriers of corresponding transmission symbols, N=2n with n being a positive integer.

20 Claims, 14 Drawing Sheets

(51) Int. Cl.
    *H04L 5/00*     (2006.01)
    *H04W 72/04*    (2009.01)

(56) References Cited

U.S. PATENT DOCUMENTS

| | | | |
|---|---|---|---|
| 8,582,605 B2 * | 11/2013 | Dai | H04L 5/0023 |
| | | | 370/491 |
| 8,891,560 B2 | 11/2014 | Kwak et al. | |
| 9,161,351 B2 | 10/2015 | Kwak et al. | |
| 2010/0046460 A1 | 2/2010 | Kwak | |
| 2010/0278109 A1 * | 11/2010 | Papasakellariou | H04L 5/0053 |
| | | | 370/328 |
| 2011/0051680 A1 | 3/2011 | Kwak | |
| 2013/0003675 A1 * | 1/2013 | Han | H04W 72/0406 |
| | | | 370/329 |
| 2013/0188587 A1 | 7/2013 | Kwak et al. | |
| 2015/0036639 A1 | 2/2015 | Kwak et al. | |
| 2016/0360518 A1 * | 12/2016 | Noh | H04L 27/2607 |

FOREIGN PATENT DOCUMENTS

| | | |
|---|---|---|
| CN | 102118782 A | 7/2011 |
| CN | 103248464 A | 8/2013 |
| CN | 103427940 A | 12/2013 |
| WO | 2011019795 A1 | 2/2011 |

OTHER PUBLICATIONS

English translation of the written opinion of the international search authority in international application No. PCT/CN2017/078212, dated Jun. 30, 2017, 7 pgs.

* cited by examiner

METHOD AND DEVICE FOR UPLINK CONTROL SIGNAL TRANSMISSION, USER TERMINAL, AND STORAGE MEDIUM

TECHNICAL FIELD

The disclosure relates to an uplink control signal transmission technology, and in particular to a method and device for uplink control signal transmission, a user terminal and a storage medium.

BACKGROUND

In Long Term Evolution (LTE) and LTE-Advanced (LTE-A) systems of a 3rd Generation Partnership Project (3GPP), a Transmission Time Interval (TTI) is a basic unit for scheduling downlink and uplink transmission in a time domain. For example, in an LTE/LTE-A Frequency Division Duplex (FDD) system, a time dimension is divided into radio frames having the length of 10 ms, herein each of the radio frames includes ten sub-frames and the length of the TTI is equal to the length of the sub-frame and is 1 ms. Each of the sub-frames includes two time slots and each time slot is 0.5 ms long. Each downlink time slot contains seven Orthogonal Frequency Division Multiplexing (OFDM) symbols (six OFDM symbols are included under an extended cyclic prefix), and each uplink time slot contains seven Single Carrier-Frequency Division Multiplexing Access (SC-FDMA) symbols (six SC-FDMA symbols are included under the extended cyclic prefix).

Compared with the LTE/LTE-A system, 3GPP subsequent evolution such as a 5th Generation (5G) mobile communication system will support a higher rate (Gbps), a massive link (1M/Km2), an ultra-low time delay (1 ms), higher reliability, hundredfold energy efficiency improvement and the like so as to support a new change in a demand. Among them, the ultra-low time delay as a key index in a 5G technology has a direct impact on the development of time delay constrained services such as an Internet of vehicles, industrial automation, remote control and an intelligent power grid.

However, an air interface time delay index of the existing LTE/LTE-A system is about 10 ms, which no longer meets the demand. An effective solution is to reduce the length of the TTI. For example, by reducing the 1 ms length of the TTI to 0.5 ms length or even 1-2 OFDM symbols, the minimum scheduling time may be reduced manyfold and thus the single transmission time delay is reduced manyfold.

When the length of the TTI is reduced, a transmission structure for sending an Acknowledgement (ACK) instruction, a Negative Acknowledgement (NACK) message and a Scheduling Request (SR) in an existing Physical Uplink Control Channel (PUCCH) will not be directly used. And meanwhile, with the reduction in the number of the symbols in the TTI, the overhead of Reference Symbols (RS) is too large. Therefore, there hasn't any appropriate technical solution yet at present.

SUMMARY

In order to solve the above technical problems, the embodiments of the disclosure provide a method and device for uplink control signal transmission, a user terminal and a storage medium.

The technical solutions in the embodiments of the disclosure are as follows.

The embodiments of the disclosure provide a method for uplink control signal transmission, which includes:

a user terminal sends K predefined sequences on M transmission symbols in a TTI to send B-bit uplink control information, herein M is a positive integer, K is an integer, $1 \leq K \leq 2^B$, B is an integer greater than or equal to 1, one of the K predefined sequences is sent on each of the M transmission symbols, the predefined sequences have a length of N and are mapped to N subcarriers of corresponding transmission symbols, N=2n with n being a positive integer.

The embodiments of the disclosure provide a device for uplink control signal transmission, which includes:

a transmission unit, arranged to send K predefined sequences on M transmission symbols in a TTI to send B-bit uplink control information, herein M is a positive integer, K is an integer, $1 \leq K \leq 2^B$, B is an integer greater than or equal to 1, one of the K predefined sequences is sent on each of the M transmission symbols, the predefined sequences have a length of N and are mapped to N subcarriers of corresponding transmission symbols, N=2n with n being a positive integer.

The embodiments of the disclosure provide a user terminal, which includes a processor and a memory; the memory stores a program or an instruction; and the processor executes the following processing by invoking the program or the instruction:

sending K predefined sequences on M transmission symbols in a TTI to send B-bit uplink control information, herein M is a positive integer, K is an integer, $1 \leq K \leq 2^B$, B is an integer greater than or equal to 1, one of the K predefined sequences is sent on each of the M transmission symbols, the predefined sequences have a length of N and are mapped to N subcarriers of corresponding transmission symbols, N=2n with n being a positive integer.

The embodiments of the disclosure provide a storage medium; a computer program is stored in the storage medium; and the computer program executes the above method for uplink control signal transmission when being invoked by a processor.

In the technical solutions provided by the embodiments of the disclosure, by carrying the uplink control information to a scene having the TTI length being 2-4 symbols, a frequency diversity gain can be obtained; and thus, the demodulation complexity of noncoherent detection at a receiving end is low, the synchronization with the user terminal is convenient, and the transmission of the ACK/NACK and the SR may be fed back during desynchronization. According to the technical solutions provided by the embodiments of the disclosure, the transmission efficiency of the uplink control information is improved, the data transmission time delay is reduced, and thus the communication efficiency is improved.

DETAILED DESCRIPTION

In order to know the characteristics and technical contents in the embodiments of the disclosure more detail, the implementation for the embodiments of the disclosure will be described below in detail with reference to the accompanying drawings. The accompanying drawings are only for reference, and are not intended to limit the embodiments of the disclosure.

Figure 1:
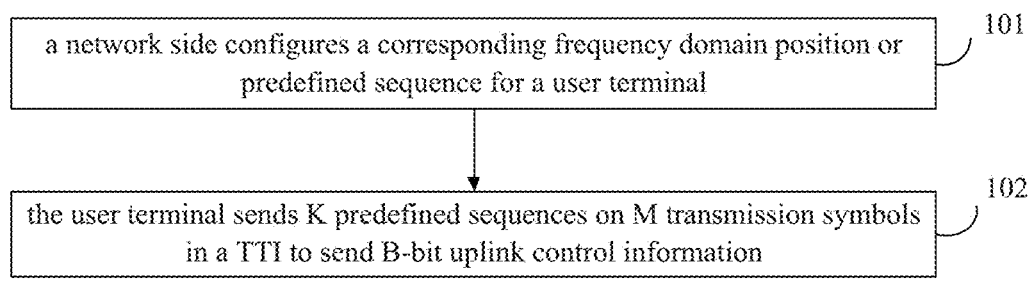
FIG. 1 is a flowchart diagram of a method for uplink control signal transmission in an embodiment of the disclosure.

FIG. 1 is a flowchart diagram of a method for uplink control signal transmission in an embodiment of the disclosure. As shown in FIG. 1, the method for uplink control signal transmission in this embodiment of the disclosure includes the following operations.

At 101, a network side configures corresponding frequency domain position or predefined sequence for a user terminal.

In order to avoid the interference among different user terminals in a network cell, the network side may configure different frequency domain positions or different predefined sequences for different user terminals.

At 102, the user terminal sends K predefined sequences on M transmission symbols in a TTI to send B-bit uplink control information.

Herein, M is a positive integer, K is an integer, $1 \leq K \leq 2^B$, B is an integer greater than or equal to 1, one of the K predefined sequences is sent on each of the M transmission symbols, the predefined sequences have a length of N and are mapped to N subcarriers of corresponding transmission symbols, N=2n with n being a positive integer.

The uplink control information in this embodiment of the disclosure is an uplink ACK/NACK message mainly and may also include an SR message.

As an implementation manner, at most M different frequency domain positions are provided on the M transmission symbols, and a number of subcarriers contained at any of the frequency domain positions is a multiple of N.

As an implementation manner, the N subcarriers are continuously mapped or equidistantly mapped to each of the frequency domain positions.

As an implementation manner, the predefined sequences include but not limited to: a Zadoff-Chu (ZC) sequence having a length of N, or a frank sequence having a length of N, or a Gray sequence having a length of N, or a Chu sequence having a length of N or a computer generated sequence having a length of N.

The K predefined sequences need to be determined by X predefined channel resources, in which X s a positive integer. The channel resources may be determined by but not limited to one of the followings:

a Downlink Control Information (DCI) dynamic indication, a high-level configuration and DCI joint indication, an implicit indication, or a joint indication of the DCI dynamic indication and the implicit indication.

When different control information is sent, predefined sequences sent on each symbol are determined by different predefined channel resources.

As an implementation manner, the K predefined sequences distributed by the network to the user terminal are obtained by performing different cyclic shifts according to a basic sequence of the ZC sequence.

As an implementation manner, in order to reduce the inter-cell interference, different ZC-based sequences can be used among different network cells, or cell-level scrambling is performed when the different network cells send the uplink control signals.

As an implementation manner, N=4.

The user terminal indicates the uplink control information using different combinations of the K different predefined sequences sent on M different time domain symbols. It is defined that the ACK corresponds to a bit "1" and the NACK corresponds to a bit "0" in transmission.

Particularly, when the 1-bit ACK/NACK is sent, the K predefined sequences are transmitted on the M symbols, including:

the number K of the predefined sequences is a integer in $1 \leq K \leq M$.

Specifically, K=2; and when the "1" and the "0" are sent, predefined sequences sent on each transmission symbol are different.

Specifically, K=1; and when the "1" and the "0" are sent, frequency domain subcarrier positions on the transmission symbols, to which the predefined sequences are mapped, are different.

As an implementation manner, the frequency domain positions on different transmission symbols, to which the predefined sequences are mapped, are the same or are not completely the same.

The ACK or NACK message is of 1 or 2 bits.

In this embodiment of the disclosure, when the sent information is the 1-bit ACK or NACK, a method includes: two predefined channel resources are defined respectively as a first predefined channel resource and a second predefined channel resource.

When the 1-bit ACK is sent, predefined sequences sent on each symbol are all determined by the first predefined channel resource.

When the 1-bit NACK is sent, predefined sequences sent on each symbol are all determined by the second predefined channel resource.

In this embodiment of the disclosure, when the sent information is the 2-bit ACK or NACK, a method includes: four predefined channel resources are defined, the four sent control information combinations (ACK, ACK), (ACK, NACK), (NACK, ACK) and (NACK, NACK) are in one-to-one correspondence with the four predefined channel resources; and for one of the four sent combinations, predefined sequences of all symbols in the TTI are all uniquely determined by one corresponding predefined channel resource.

In this embodiment of the disclosure, when the sent information is the 2-bit ACK or NACK, four predefined channel resources are defined respectively as first, second, third and fourth predefined channel resources. The four sent control information combinations include: (ACK, ACK), (ACK, NACK), (NACK, ACK) and (NACK, NACK).

When the (ACK, ACK) is sent, predefined sequences sent on each symbol at the first frequency domain position are all determined by the first predefined channel resource, and predefined sequences sent on each symbol at the second frequency domain position are all determined by the second predefined channel resource.

When the (ACK, NACK) is sent, predefined sequences sent on each symbol at the first frequency domain position are all determined by the second predefined channel resource, and predefined sequences sent on each symbol at the second frequency domain position are all determined by the first predefined channel resource.

When the (NACK, ACK) is sent, predefined sequences sent on each symbol at the first frequency domain position are all determined by the third predefined channel resource, and predefined sequences sent on each symbol at the second frequency domain position are all determined by the fourth predefined channel resource.

When the (NACK, NACK) is sent, predefined sequences sent on each symbol at the first frequency domain position are all determined by the fourth predefined channel resource, and predefined sequences sent on each symbol at the second frequency domain position are all determined by the third predefined channel resource.

The number of sending antenna ports is 1.

When the number of sending antenna ports is a positive integer A, the defined number of predefined channel resources is $A*2^B$.

For each transmission, the predefined sequences sent on each transmission symbol include at least one of the following characteristics:

cell-level randomization or user-level randomization is present among the predefined sequences sent on the each transmission symbol; and a random mapping process is present among predefined sequences of symbols at different frequency domain positions.

The channel resources include at least one of the following characteristics:

when $\Delta_{shift}^{PUCCH}=1$ or 2, $|n_{sPUCCH,i}^{(1,\tilde{p})} - n_{PUCCH}^{(1,\tilde{p})}| \mod N_{sc}^{RB} \neq 0$;

when $\Delta_{shift}^{PUCCH}=3$, $n_{sPUCCH,i}^{(1,\tilde{p})} \neq n_{PUCCH}^{(1,\tilde{p})}$;

or $\Delta_{shift}^{PUCCH}=1$ or 2 or 3, $|n_{sPUCCH,i}^{(1,\tilde{p})} - n_{PUCCH}^{(1,\tilde{p})}| \mod N_{sc}^{RB} \neq 0$.

Where, the $n_{sPUCCH,i}^{(1,\tilde{p})}$ is predefined channel resources distributed for the sent control information, the $n_{PUCCH}^{(1,\tilde{p})}$ is channel resources with an LTE PUCCH format of 1/1a/1b, and the $N_{sc}^{RB}$ is a number of subcarriers in a resource block.

Specifically, when M is smaller than or equal to 7, the frequency domain positions on the different transmission symbols, to which the predefined sequences are mapped, are at two sides of a system bandwidth.

Particularly, when the 2-bit ACK/NACK is sent, the K predefined sequences are transmitted on the M symbols, including:

the number K of the predefined sequences is 1, 2 or 4. Each symbol is configured with one frequency domain position, there are $$\frac{4}{K}$$

different subcarrier configurations at the frequency domain position, and each configuration includes N different subcarriers.

As an implementation manner, the frequency domain positions on different transmission symbols, to which the predefined sequences are mapped, are the same or are not completely the same.

As an implementation manner, when K=4, predefined sequences corresponding to the sent "00", "01", "10" and "11" and sent on each transmission symbol are different.

As an implementation manner, when K=2, the frequency domain position on each transmission symbol is configured with two subcarrier positions; and when the "00", "01", "10" and "11" are sent, different predefined sequences are sent correspondingly on each transmission symbol, or the predefined sequences occupy different subcarrier positions on the transmission symbols.

As an implementation manner, when K=1, the frequency domain position on each transmission symbol is configured with four subcarrier positions; and when the "00", "01", "10" and "11" are sent, different subcarrier positions are occupied correspondingly on each transmission symbol.

Specifically, when M=2 and the 1-bit ACK/NACK is sent, it is preferred that N=4, K=2.

As an implementation manner, the two predefined sequences are defined as a first predefined sequence and a second predefined sequence. Correspondingly, sending the 1-bit ACK/NACK includes:

the first predefined sequence and the second predefined sequence are mapped to two different time domain symbol positions in the TTI; and the 1-bit control information is indicated using different combinations of the different predefined sequences on different time domain symbols. The specific implementation manner includes, but is not limited to, the following combinations:

when the user terminal sends an ACK message, the first predefined sequence is sent on the first symbol and the second predefined sequence is sent on the second symbol; when the user terminal sends an NACK message, the second predefined sequence is sent on the first symbol and the first predefined sequence is sent on the second symbol;

or, when the user terminal sends the ACK message, the two symbols both send the first predefined sequence; and when the user terminal sends the NACK message, the two symbols both send the second predefined sequence.

As an implementation manner, the frequency domain positions where the first predefined sequence and the second predefined sequence are located on each time domain symbol are different, specifically, at two sides of the system bandwidth.

As an implementation manner, when the sent information is a 1-bit ACK or NACK, two predefined channel resources are defined respectively as a first predefined channel resource and a second predefined channel resource; and when the predefined sequences are sent at two frequency domain positions that are defined respectively as a first frequency domain position and a second frequency domain position.

When the 1-bit ACK is sent, predefined sequences sent on each symbol at the first frequency domain position are all determined by the first predefined channel resource, and predefined sequences sent on each symbol at the second frequency domain position are all determined by the second predefined channel resource.

When the 1-bit NACK is sent, predefined sequences sent on each symbol at the first frequency domain position are all determined by the second predefined channel resource, and predefined sequences sent on each symbol at the second frequency domain position are all determined by the first predefined channel resource.

Specifically, when M=2 and the 2-bit ACK/NACK is sent, it is preferred that N=4, K=4 or N=4, K=2.

When N=4, K=4, the four predefined sequences are respectively defined as a first predefined sequence, a second predefined sequence, a third predefined sequence and a fourth predefined sequence. Correspondingly, sending the 2-bit ACK/NACK includes:

the four predefined sequences are mapped to two different time domain symbol positions in the TTI; and the 2-bit control information is indicated using different combinations of the different predefined sequences on different time domain symbols. The specific implementation manner includes, but is not limited to, the following combinations:

when the "0, 0" is sent, the first predefined sequence is sent on the first symbol and the second predefined sequence is sent on the second symbol; when the "0, 1" is sent, the second predefined sequence is sent on the first symbol and the first predefined sequence is sent on the second symbol; when the "1, 0" is sent, the third predefined sequence is sent on the first symbol and the fourth predefined sequence is sent on the second symbol; and when the "1, 1" is sent, the fourth predefined sequence is sent on the first symbol and the third predefined sequence is sent on the second symbol;

or, when the "0, 0" is sent, the first predefined sequence is sent on both symbols; when the "0, 1" is sent, the second predefined sequence is sent on both symbols; when the "1, 0" is sent, the third predefined sequence is sent on both symbols; and when the "1, 1" is sent, the fourth predefined sequence is sent on both symbols.

As an implementation manner, the frequency domain positions where the predefined sequences are located on each time domain symbol are different, specifically, at two sides of the system bandwidth.

When N=4, K=2, the two predefined sequences are respectively defined as a first predefined sequence and a second predefined sequence. As an implementation manner, the first symbol is provided with a frequency domain position called as a first frequency domain position; and then, two subcarrier positions, namely a first subcarrier position and a second subcarrier position are configured at this frequency domain position. The second symbol is provided with a frequency domain position called as a second frequency domain position; and then, two subcarrier positions, namely a third subcarrier position and a fourth subcarrier position are configured at this frequency domain position. The subcarrier positions are equidistant discrete subcarriers, or continuous N subcarriers. For example, the first subcarrier position is a subcarrier position indexed by an even number, and the second subcarrier position is a subcarrier position indexed by an odd number. The two predefined sequences are mapped to different subcarrier positions at two different time domain symbol positions in the TTI, and the 2-bit control information is indicated using different mapping combinations. The specific implementation manner includes, but is not limited to, the following combinations:

when the "0, 0" is sent, the first predefined sequence is sent on the first symbol and is mapped to the first subcarrier position and the second predefined sequence is sent on the second symbol and is mapped to the third subcarrier position; when the "0, 1" is sent, the first predefined sequence is sent on the first symbol and is mapped to the second subcarrier position and the second predefined sequence is sent on the second symbol and is mapped to the fourth subcarrier position; when the "1, 0" is sent, the second predefined sequence is sent on the first symbol and is mapped to the first subcarrier position and the first predefined sequence is sent on the second symbol and is mapped to the third subcarrier position; and when the "1, 1" is sent, the second predefined sequence is sent on the first symbol and is mapped to the second subcarrier position and the first predefined sequence is sent on the second symbol and is mapped to the fourth subcarrier position.

As an implementation manner, the first frequency domain position and the second frequency domain position are at two sides of the system bandwidth.

Specifically, when M=3 and the 1-bit ACK/NACK is sent, it is preferred that N=4, K=2 or N=4, K=3.

When N=4, K=2, the two predefined sequences are defined as a first predefined sequence and a second predefined sequence. Correspondingly, sending the 1-bit ACK/NACK includes:

the 1-bit control information is indicated using different combinations of the different predefined sequences sent on three different time domain symbols. The specific implementation manner includes, but is not limited to, the following combinations:

when the user terminal sends an ACK message, the first predefined sequence is sent on the first symbol, the second predefined sequence is sent on the second symbol and the first predefined sequence is sent on the third symbol; when the user terminal sends an NACK message, the second predefined sequence is sent on the first symbol, the first predefined sequence is sent on the second symbol and the second predefined sequence is sent on the third symbol.

As an implementation manner, the frequency domain positions where the predefined sequences are located on each time domain symbol are different; specifically, three frequency domain positions are uniformly distributed in a bandwidth of the whole system.

Specifically, when M=3 and the 2-bit ACK/NACK is sent, it is preferred that N=4, K=4, or N=4, K=2.

When N=4, K=4, the four predefined sequences are respectively defined as a first predefined sequence, a second predefined sequence, a third predefined sequence and a fourth predefined sequence.

Correspondingly, sending the 2-bit ACK/NACK includes:

the four predefined sequences are mapped to three different time domain symbol positions in the TTI; and the 2-bit control information is indicated using different combinations of the different predefined sequences on different time domain symbols. Specifically, when the "00", "01", "10"

and "11" are sent, different predefined sequences are sent correspondingly on each transmission symbol. For example, the specific implementation manner includes, but is not limited to, the following combinations:

when the "0, 0" is sent, the first predefined sequence is sent on the first symbol, the fourth predefined sequence is sent on the second symbol and a third predefined sequence is sent on the third symbol; when the "0, 1" is sent, the second predefined sequence is sent on the first symbol, the first predefined sequence is sent on the second symbol, and the fourth predefined sequence is sent on the third symbol; when the "1, 0" is sent, the third predefined sequence is sent on the first symbol, the second predefined sequence is sent on the second symbol, and the first predefined sequence is sent on the third symbol; and when the "1, 1" is sent, the fourth predefined sequence is sent on the first symbol, the third predefined sequence is sent on the second symbol and the second predefined sequence is sent on the third symbol.

When N=4, K=2, the two predefined sequences are respectively defined as a first predefined sequence and a second predefined sequence. As an implementation manner, the first symbol is provided with a frequency domain position that is respectively a first frequency domain position, a second frequency domain position and a third frequency domain position; and then, two subcarrier positions are configured in each frequency domain position. The two predefined sequences are mapped to different subcarrier positions at different frequency domain positions of three different time domain symbols in the TTI, and the 2-bit control information is indicated using different mapping combinations.

Specifically, when M=4 and the 1-bit ACK/NACK is sent, it is preferred that N=4, K=2.

The two predefined sequences are defined as a first predefined sequence and a second predefined sequence.

Correspondingly, sending the 1-bit ACK/NACK includes:

the 1-bit control information is indicated using different combinations of the different predefined sequences sent on four different time domain symbols. The specific implementation manner includes, but is not limited to, the following combinations:

when the user terminal sends an ACK message, the first predefined sequence is sent on the first symbol, the second predefined sequence is sent on the second symbol, the first predefined sequence is sent on the third symbol and the second predefined sequence is sent on the fourth symbol; and when the user terminal sends an NACK message, the second predefined sequence is sent on the first symbol, the first predefined sequence is sent on the second symbol, the second predefined sequence is sent on the third symbol and the fourth sends the first predefined sequence.

As an implementation manner, the frequency domain positions where the predefined sequences are located on each time domain symbol are not completely the same. The frequency domain positions where the predefined sequences are located on each time domain symbol are all different, and the four frequency domain positions are uniformly distributed in the bandwidth of the whole system; or the frequency domain positions where the predefined sequences are located on first and second time domain symbols are the same, the frequency domain positions on third and fourth time domain symbols are the same, and the frequency domain positions where the four symbols are located are not completely the same.

Specifically, when M=4 and the 2-bit ACK/NACK is sent, it is preferred that N=4, K=4.

When N=4, K=4, the four predefined sequences are respectively defined as a first predefined sequence, a second predefined sequence, a third predefined sequence and a fourth predefined sequence.

Correspondingly, sending the 2-bit ACK/NACK includes:

the four predefined sequences are mapped to four different time domain symbol positions in the TTI; and the 2-bit control information is indicated using different combinations of the different predefined sequences on different time domain symbols. Specifically, when the "00", "01", "10" and "11" are sent, different predefined sequences are sent correspondingly on each transmission symbol. For example, the specific implementation manner includes, but is not limited to, the following combinations:

when the "0, 0" is sent, the first, second, third and fourth predefined sequences are sent in sequence on the first, second, third and fourth symbols; when the "0, 1" is sent, the second, third, fourth and first predefined sequences are sent in sequence on the first, second, third and fourth symbols; when the "1, 0" is sent, the third, fourth, first and second predefined sequences are sent in sequence on the first, second, third and fourth symbols; and when the "1, 1" is sent, the fourth, first, second and third predefined sequences are sent in sequence on the first, second, third and fourth symbols.

When the user terminal sends the SR, it is preferred that K=1, 2 or 4.

When K=1, the predefined sequence is sent on each of the M symbols.

When K=2, the two predefined sequences are respectively defined as an SR first predefined sequence and an SR second predefined sequence. When the SR is sent individually, either of the two predefined sequences is sent on each symbol, and different predefined sequences are sent on different symbols. Particularly, when M=2, the SR first predefined sequence is sent on the first symbol and the SR second predefined sequence is sent on the second symbol.

Further, when the SR is multiplexed with the ACK/NACK, the ACK/NACK is sent using the two predefined sequences of the SR.

Particularly, when M=2 and the SR is multiplexed with the ACK/NACK, if the SR and the ACK are sent simultaneously, the SR first predefined sequence is sent on the first symbol and the SR second predefined sequence is sent on the second symbol. If the SR and the NACK are sent simultaneously, the SR second predefined sequence is sent on the first symbol and the SR first predefined sequence is sent on the second symbol.

When K=4, the four predefined sequences are respectively defined as SR first, second, third and fourth predefined sequences. When the SR is sent individually, one of the four predefined sequences is sent on each symbol, and different predefined sequences are sent on different symbols.

Further, when the SR is multiplexed with the ACK/NACK, the ACK/NACK is sent using the four predefined sequences of the SR.

Particularly, when M=2 and the SR is multiplexed with the 2-bit ACK/NACK, if the SR and "0, 0" are sent simultaneously, the SR first predefined sequence is sent on the first symbol and the SR second predefined sequence is sent on the second symbol; if the SR and "0, 1" are sent simultaneously, the SR second predefined sequence is sent on the first symbol and the SR first predefined sequence is sent on the second symbol; if SR and "1, 0" are sent simultaneously, the SR third predefined sequence is sent on the first symbol and the SR fourth predefined sequence is sent on the second symbol; and SR and "1, 1" are sent simultaneously, the SR fourth predefined sequence is sent on the first symbol and the SR third predefined sequence is sent on the second symbol.

As an implementation manner, the frequency domain positions of the predefined sequences on each time domain symbol are the same or are not completely the same. Specifically, when M=2, the frequency domain positions where the predefined sequences are located on each time domain symbol are different and are at two sides of a system bandwidth. When M=3, the frequency domain positions where the predefined sequences are located on each time domain symbol are all different, and the three frequency domain positions are uniformly distributed in the bandwidth of the whole system. When M=4, the frequency domain positions where the predefined sequences are located on each time domain symbol are all different, and the four frequency domain positions are uniformly distributed in the bandwidth of the whole system; or the frequency domain positions where the predefined sequences are located on first and second time domain symbols are the same, the frequency domain positions on third and fourth time domain symbols are the same, and the frequency domain positions where the four symbols are located are not completely the same.

In this embodiment of the disclosure, the SR predefined sequences are determined by one or two or four predefined channel resources.

The essences of the technical solutions in the embodiments of the disclosure are further described below with specific examples.

First Embodiment

Figure 2:
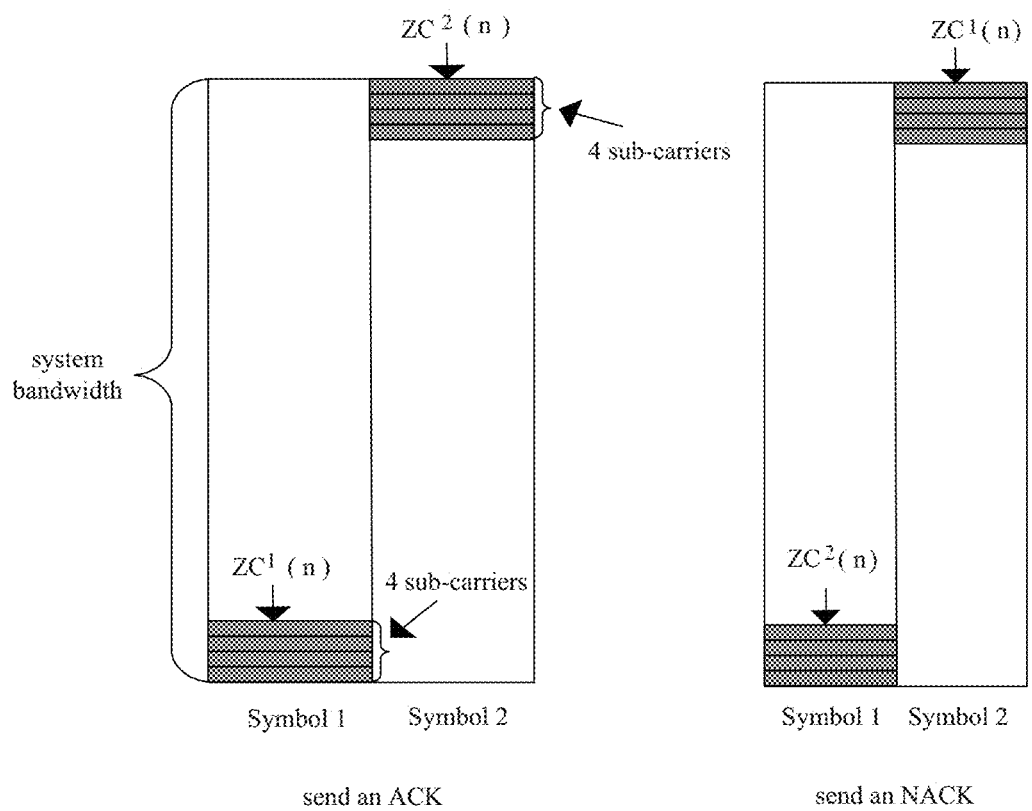
FIG. 2 is a schematic diagram, in which a user terminal sends a 1-bit ACK/NACK using two predefined sequences having the length of 4 on two symbols, in an embodiment of the disclosure.

FIG. 2 is a schematic diagram, in which a user terminal sends a 1-bit ACK/NACK using two predefined sequences on two symbols. It is assumed that the predefined sequences distributed by a network to the user terminal respectively are a $ZC_1(n)$ and a $ZC_2(n)$. The length of each sequence is 4, and the sequences on the frequency domain are mapped to continuous four subcarriers. First of all, a ZC-based sequence is generated using the following formula:

$$ZC_q(n) = \exp\left(\frac{-jq\pi n^2}{N}\right) \quad (1)$$

Where, the q is a basic sequence index, and the $ZC_1(n)$ and the $ZC_2(n)$ may be obtained by respectively performing different time domain cyclic shifts on the basic sequence.

As shown in FIG. 2, when the ACK message is sent, the user terminal sends the sequence $ZC_1(n)$ at the symbol 1 place, and sends the sequence $ZC_2(n)$ at the symbol 2 place; and when the NACK message is sent, the user terminal sends the sequence $ZC_2(n)$ at the symbol 1 place, and sends the sequence $ZC_1(n)$ at the symbol 2 place. Moreover, the frequency domain positions on the two symbols, to which the predefined sequences are mapped, are different, and are located at two sides of a system bandwidth.

A receiving end may judge the transmission of the ACK/NACK according to noncoherent detection.

Second Embodiment

Figure 3:
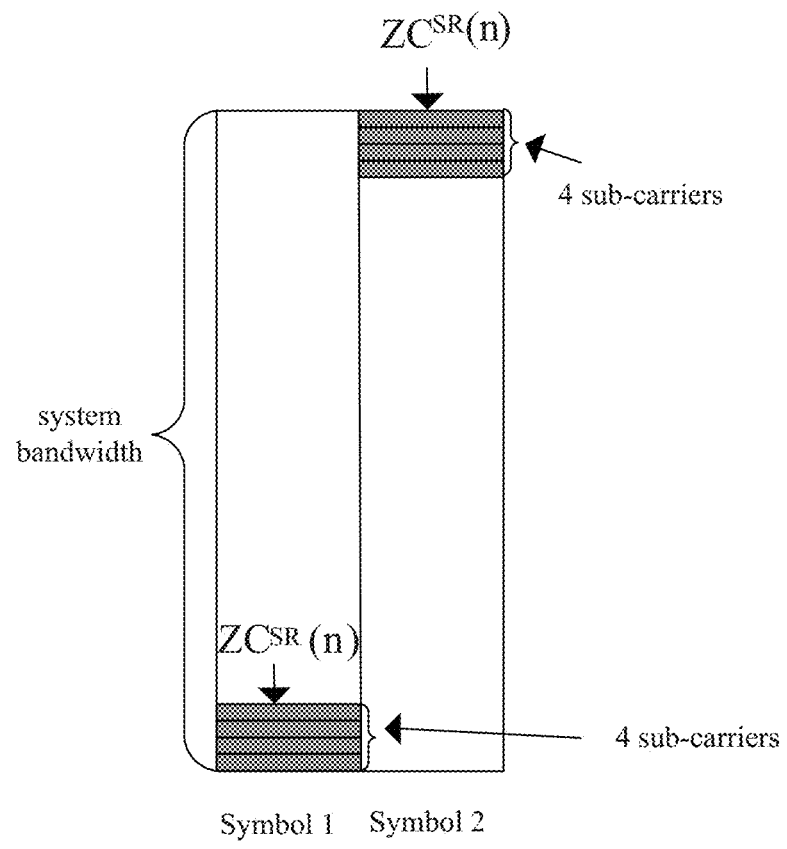
FIG. 3 is a schematic diagram, in which a user terminal employs a predefined sequence SR on two symbols, in an embodiment of the disclosure.

FIG. 3 is a schematic diagram, in which a user terminal employs a predefined sequence SR on two symbols. The length of the predefined sequence is N=4, and the predefined sequence is mapped to continuous frequency domain subcarriers. It is assumed that the predefined sequences distributed by a network to the user terminal are $ZC_{SR}(n)$ and the configuration is the SR transmission. The two symbols both send the predefined sequences, and the frequency domain positions on the two symbols, to which the predefined sequences are mapped, are different, and are located at two sides of a system bandwidth. A receiving end may judge whether the SR transmission is present or not according to energy detection.

Third Embodiment

Figure 4:
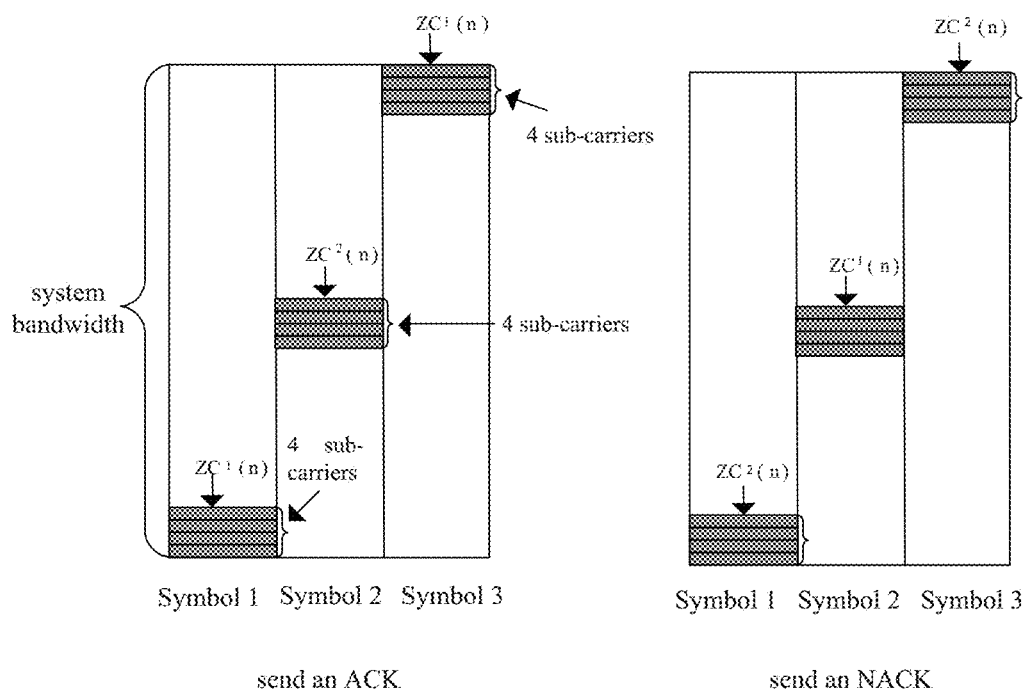
FIG. 4 is a schematic diagram, in which a user terminal sends a 1-bit ACK/NACK using two predefined sequences on three symbols, in an embodiment of the disclosure.

FIG. 4 is a schematic diagram, in which a user terminal sends a 1-bit ACK/NACK using two predefined sequences on three symbols. It is assumed that the predefined sequences distributed by a network to the user terminal respectively are a $ZC_1(n)$ and a $ZC_2(n)$. The length of each sequence is 4, and the sequences on the frequency domain are mapped to continuous four subcarriers.

When the user terminal sends the ACK message, the $ZC_1(n)$ is sent on the first symbol, the $ZC_2(n)$ is sent on the second symbol, and the $ZC_1(n)$ is sent on the third symbol; and when the user terminal sends the NACK message, the $ZC_2(n)$ is sent on the first symbol, the $ZC_1(n)$ is sent on the second symbol, and the $ZC_2(n)$ is sent on the third symbol. Moreover, the predefined sequences on each symbol are mapped to different frequency domain positions, and the three frequency domain positions are uniformly and respectively are in a system bandwidth.

Fourth Embodiment

Figure 5:
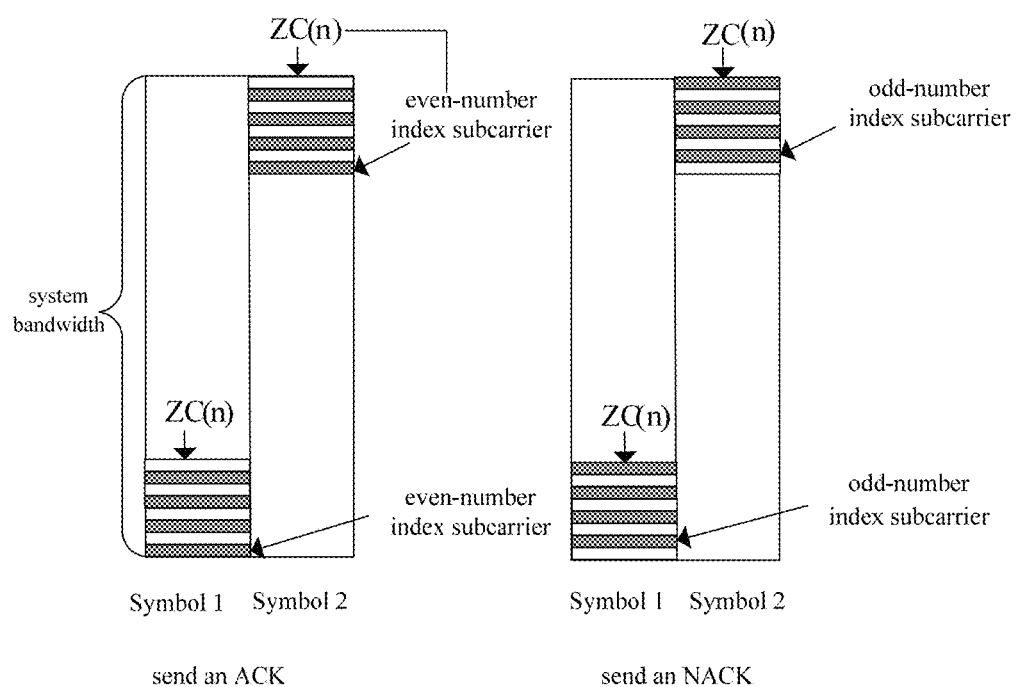
FIG. 5 is a schematic diagram, in which a user terminal sends a 1-bit ACK/NACK using one predefined sequence on two symbols, in an embodiment of the disclosure.

FIG. 5 is a schematic diagram, in which a user terminal sends a 1-bit ACK/NACK using one predefined sequence on two symbols. It is assumed that the predefined sequence distributed by a network to the user terminal is a ZC (n). The length of the sequence is 4, and the sequences on the frequency domain are mapped to continuous four subcarriers. The network is simultaneously provided with two different subcarrier positions on a frequency domain of each symbol, for example, an even-number subcarrier position and an odd-number subcarrier position in the figure.

The sequence ZC (n) is sent on both the two symbols. When the user terminal sends the ACK message, the sequence is mapped to an even-number subcarrier; and when the user terminal sends the NACK message, the sequence is mapped to an odd-number subcarrier.

A receiving end may judge whether the ACK or the NACK is sent by performing noncoherent detection on different subcarriers.

Fifth Embodiment

Figure 6:
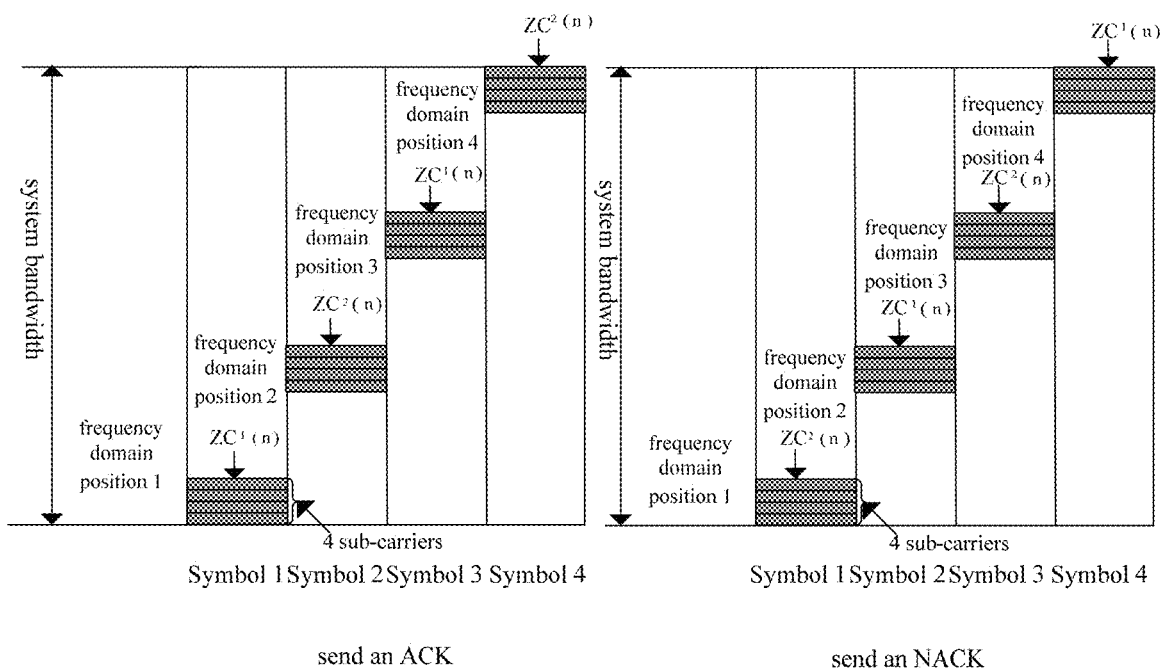
FIG. 6 is a schematic diagram, in which a user terminal sends a 1-bit ACK/NACK using two predefined sequences on four symbols, in an embodiment of the disclosure.

FIG. 6 is a schematic diagram, in which a user terminal sends a 1-bit ACK/NACK using two predefined sequences on four symbols. It is assumed that the predefined sequences distributed by a network to the user terminal respectively are a $ZC_1(n)$ and a $ZC_2(n)$. The length of each sequence is 4, and the sequences on the frequency domain are mapped to continuous four subcarriers.

When the user terminal sends the ACK message, the $ZC_1(n)$ is sent on the first symbol at a frequency domain position 1, the $ZC_2(n)$ is sent on the second symbol at a frequency domain position 2, the $ZC_1(n)$ is sent on the third symbol at a frequency domain position 3, and the $ZC_2(n)$ is sent on the fourth symbol at a frequency domain position 4; and when the user terminal sends the NACK message, the $ZC_2(n)$ is sent on the first symbol at the frequency domain position 1, the $ZC_1(n)$ is sent on the second symbol at the frequency domain position 2, the $ZC_2(n)$ is set on the third symbol at the frequency domain position 3, and the $ZC_1(n)$ is sent on the fourth symbol at the frequency domain position 4. The four frequency domain positions are uniformly and respectively are in a system bandwidth. A receiving end judges whether the ACK or the NACK is sent by performing the noncoherent detection using corresponding predefined sequences at different frequency domain positions.

Sixth Embodiment

Figure 7:
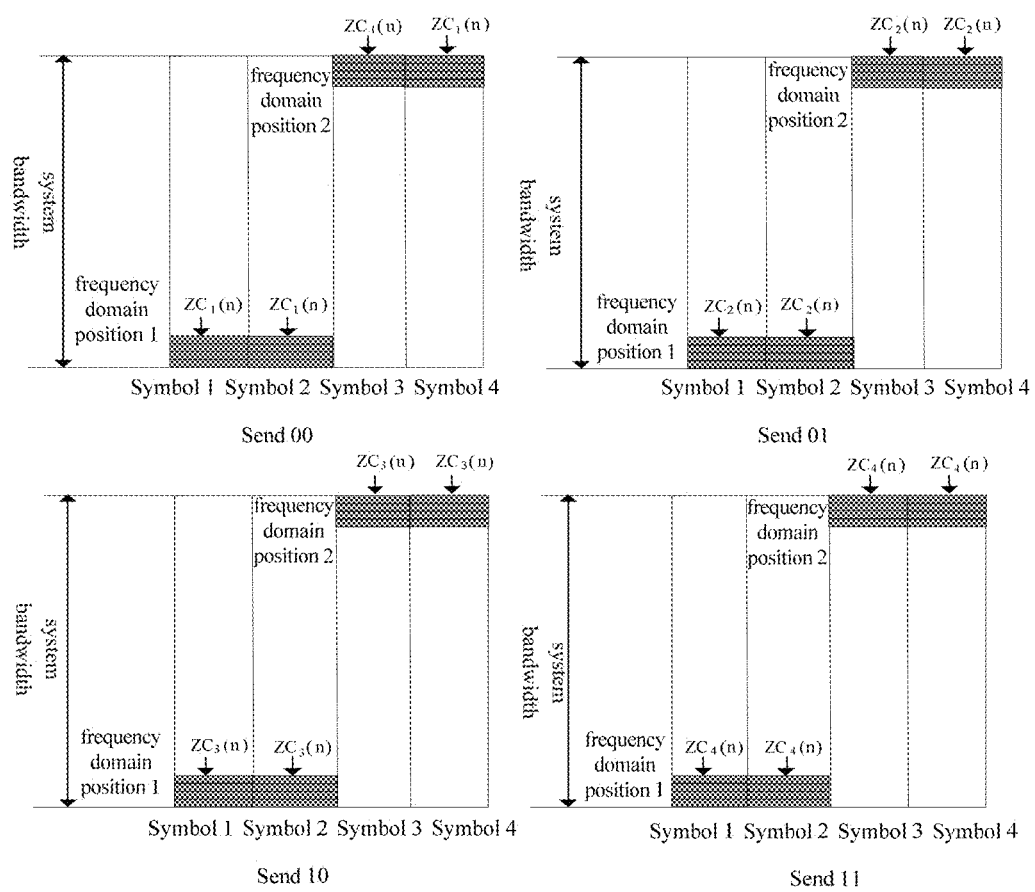
FIG. 7 is a schematic diagram, in which a user terminal sends a 2-bit ACK/NACK using four predefined sequences on four symbols, in an embodiment of the disclosure.

FIG. 7 is a schematic diagram, in which a user terminal sends a 2-bit ACK/NACK using four predefined sequences on four symbols. It is assumed that the predefined sequences distributed by a network to the user terminal respectively are a $ZC_1(n)$, a $ZC_2(n)$, a $ZC_3(n)$ and a $ZC_4(n)$. The length of each sequence is 4, and the sequences on the frequency domain are mapped to continuous four subcarriers.

The predefined sequences on front two symbols are mapped to four subcarriers on a frequency domain position 1. The predefined sequences on rear two symbols are mapped to four subcarriers on a frequency domain position 2. The frequency domain position 1 and the frequency domain position 2 are at two sides of a system bandwidth.

Specifically, when the user terminal sends the "00" message, the $ZC_1(n)$ is sent on the front two symbols at a frequency domain position 1, and the $ZC_1(n)$ is sent on the rear two symbols at a frequency domain position 2; when the user terminal sends the "01" message, the $ZC_2(n)$ is sent on the front two symbols at the frequency domain position 1, and the $ZC_2(n)$ is sent on the rear two symbols at the frequency domain position 2; when the user terminal sends the "10" message, the $ZC_3(n)$ is sent on the front two symbols at the frequency domain position 1 and the $ZC_3(n)$ is sent on the rear two symbols at the frequency domain position 2; and when the user terminal sends the "11" message, the $ZC_4(n)$ is sent on the front two symbols at the frequency domain position 1, and the $ZC_4(n)$ is sent on the rear two symbols at the frequency domain position 2.

A receiving end judges the 2-bit ACK/NACK by performing the noncoherent detection using corresponding predefined sequences at different frequency domain positions.

Seventh Embodiment

Figure 8:
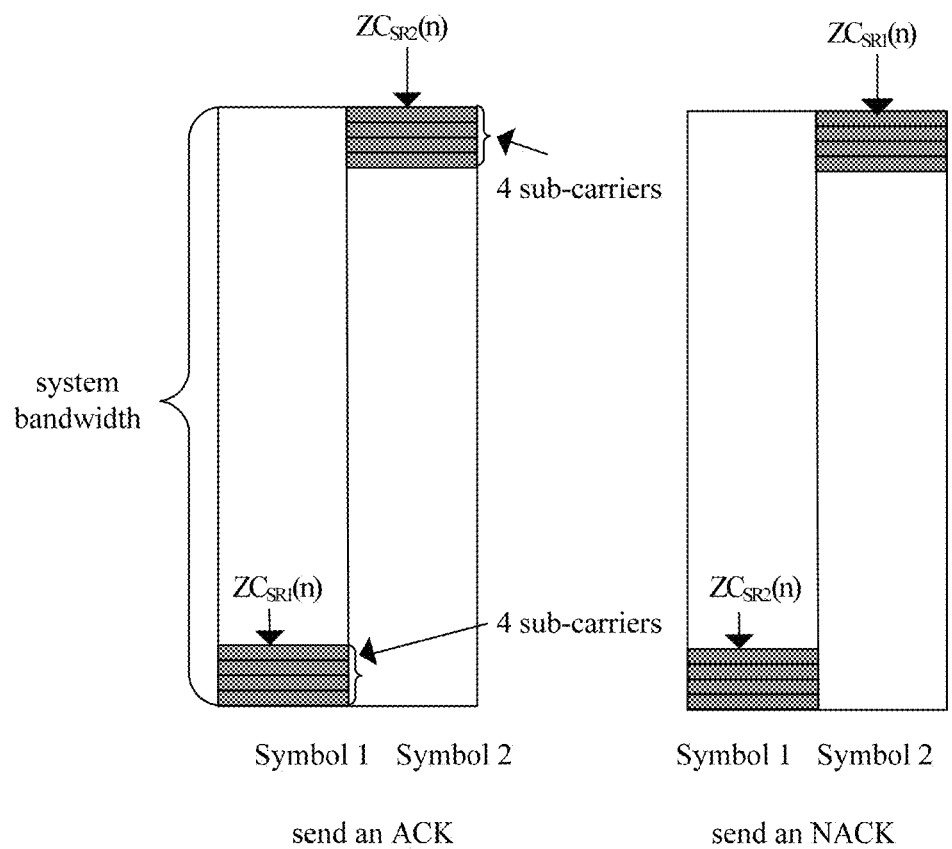
FIG. 8 is a schematic diagram, in which a user terminal sends a 1-bit ACK/NACK+SR using two predefined sequences on two symbols, in an embodiment of the disclosure.

FIG. 8 is a schematic diagram, in which a user terminal sends a 1-bit ACK/NACK using two predefined sequences on two symbols. It is assumed that the predefined sequences distributed by a network to the user terminal respectively are a $ZC_{SR1}(n)$ and a $ZC_{SR2}(n)$. The length of each sequence is 4. At this moment, if the user terminal simultaneously needs to send the 1-bit ACK/NACK, the user terminal sends the $ZC_{SR1}(n)$ and the $ZC_{SR2}(n)$ on the two symbols, thereby implementing the multiplexing between the ACK/NACK and the SR.

As shown in FIG. 8, when the user terminal needs to send the SR and simultaneously sends the ACK message, the user terminal sends the sequence $ZC_{SR1}(n)$ at the symbol 1 place, and sends the sequence $ZC_{SR2}(n)$ at the symbol 2 place; and when the NACK message is sent simultaneously, the user terminal sends the sequence $ZC_{SR2}(n)$ at the symbol 1 place, and sends the sequence $ZC_{SR1}(n)$ at the symbol 2 place. Moreover, the frequency domain positions on the two symbols, to which the predefined sequences are mapped, are different, and are located at two sides of a system bandwidth.

A receiving end judges whether the SR is sent and judges whether the ACK/NACK is sent by performing the energy detection on corresponding symbols using the $ZC_{SR1}(n)$ and the $ZC_{SR2}(n)$.

Eighth Embodiment

Figure 9:
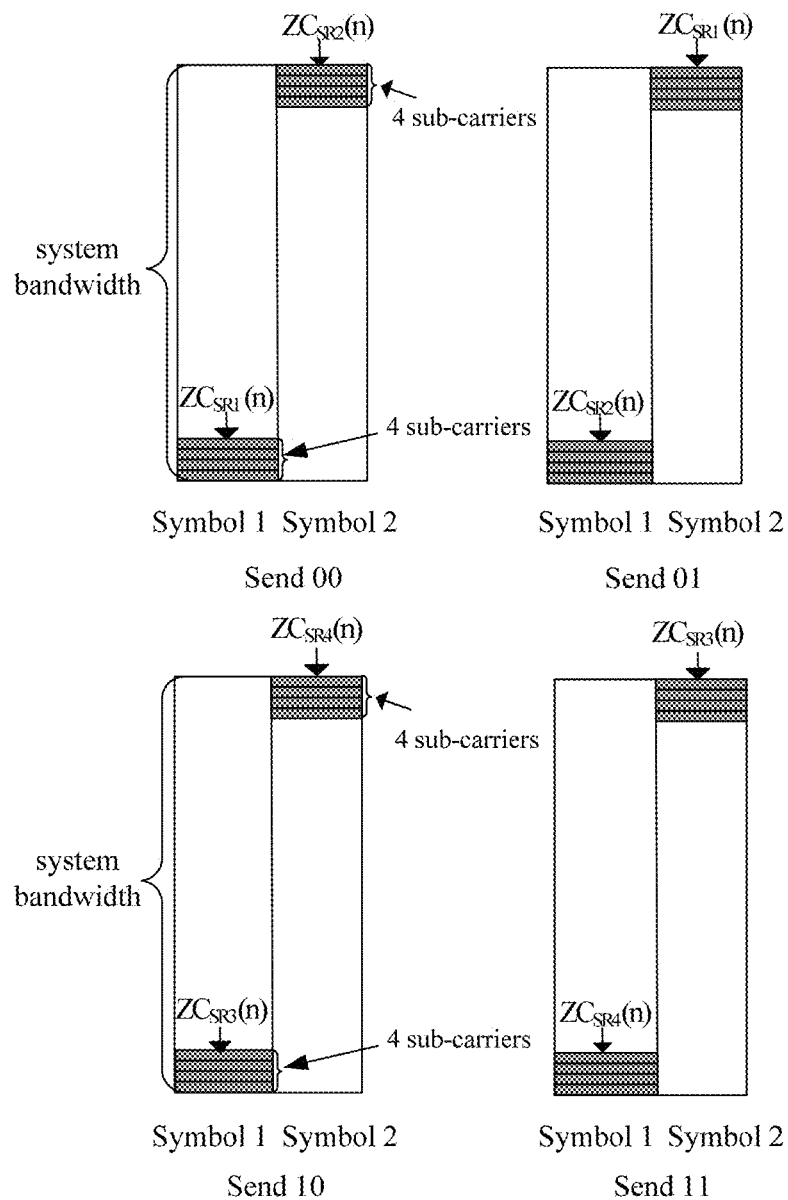
FIG. 9 is a schematic diagram, in which a user terminal sends a 2-bit ACK/NACK+SR using four predefined sequences on two symbols, in an embodiment of the disclosure.

FIG. 9 is a schematic diagram, in which a user terminal sends a 2-bit ACK/NACK+SR using four predefined sequences on two symbols. It is assumed that the predefined sequences distributed by a network to the user terminal respectively are a ZCSR1(n), a ZCSR2(n), a ZCSR3(n) and a ZCSR4(n). The length of each sequence is 4. At this moment, if the user terminal simultaneously needs to send the 2-bit ACK/NACK, the user terminal sends predefined sequences of the four SR on the two symbols, thereby implementing the multiplexing between the ACK/NACK and the SR.

As shown in FIG. 9, when the user needs to send the SR and simultaneously sends the "00" ACK/NACK message, the user sends the sequence ZCSR1(n) at a symbol 1 place and sends the sequence ZCSR2(n) at a symbol 2 place; when the "01" ACK/NACK message is sent simultaneously, the user sends the sequence ZCSR2(n) at the symbol 1 place and sends the sequence ZCSR1(n) at the symbol 2 place; when the "10" ACK/NACK message is sent simultaneously, the user sends the sequence ZCSR3(n) at the symbol 1 place and sends the sequence ZC SR4(n) at the symbol 2 place; and when the "11" ACK/NACK message is sent simultaneously, the user sends the sequence ZCSR4(n) at the symbol 1 place and sends the sequence ZCSR3(n) at the symbol 2 place. Moreover, the frequency domain positions on the two symbols, to which the predefined sequences are mapped, are different, and are located at two sides of a system bandwidth.

A receiving end judges whether the SR is sent and judges whether the ACK/NACK is sent by performing the energy detection on corresponding symbols using the four predefined sequences.

Ninth Embodiment

Figure 10:
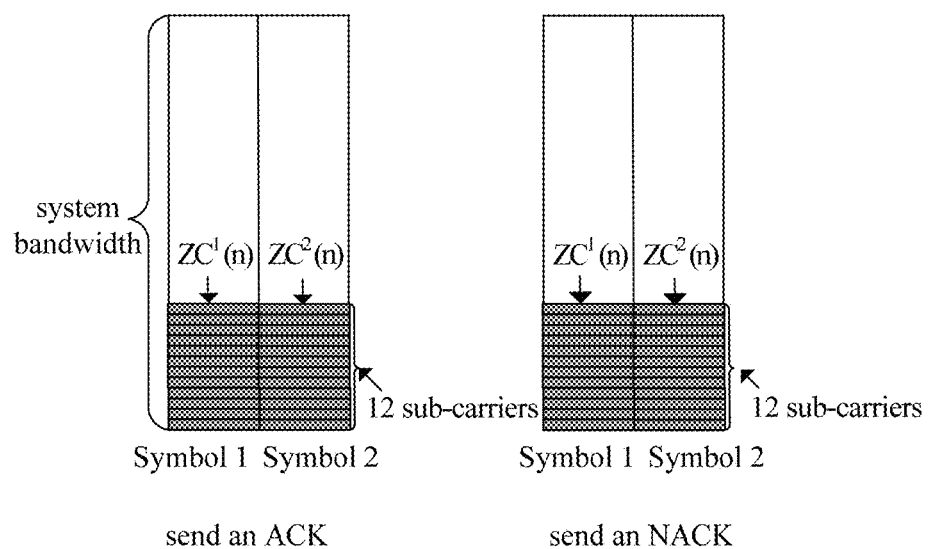
FIG. 10 is a schematic diagram, in which a user terminal sends a 1-bit ACK/NACK using two predefined sequences having the length of 12 on two symbols, in an embodiment of the disclosure.

FIG. 10 is a schematic diagram, in which a user terminal sends a 1-bit ACK/NACK using two predefined sequences on two symbols. It is assumed that the predefined sequences distributed by a network to the user terminal respectively are a $ZC_1(n)$ and a $ZC_2(n)$. The length of each sequence is N=12, and computer generated sequences used by a PUCCH in an existing LTE system are adopted.

As shown in FIG. 10, when the ACK message is sent, the user sends the sequence $ZC_1(n)$ at the symbol 1 place, and sends the sequence $ZC_2(n)$ at the symbol 2 place; and when the NACK message is sent, the user sends the sequence ZC2 (n) at the symbol 1 place, and sends the sequence ZC1(n) at the symbol 2 place. Moreover, the frequency domain positions on the two symbols, to which the predefined sequences are mapped, are different.

A receiving end may judge the transmission of the ACK/NACK according to noncoherent detection.

Tenth Embodiment

Figure 11:
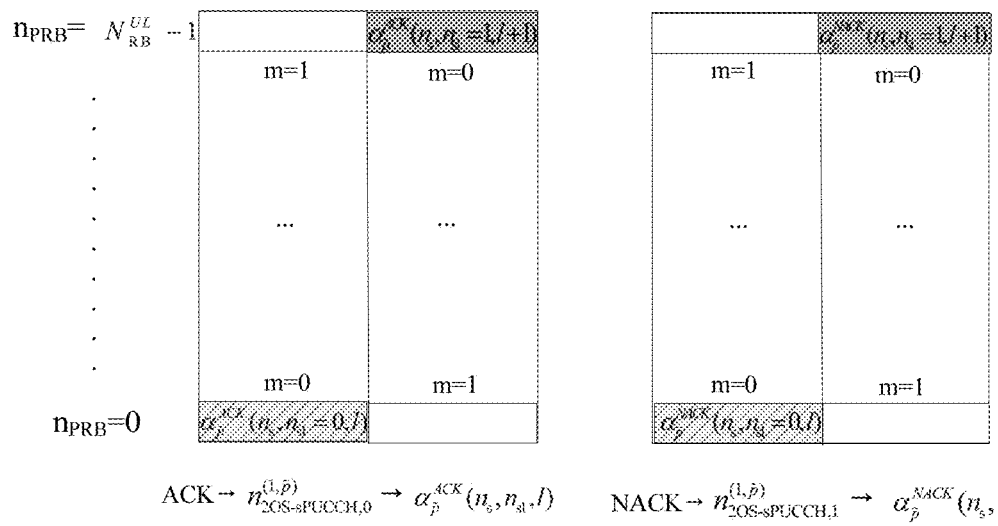
FIG. 11 is a schematic diagram, in which a user terminal sends a 1-bit ACK/NACK on two symbols, in an embodiment of the disclosure.

FIG. 11 is a schematic diagram, in which a user terminal sends a 1-bit ACK/NACK on two symbols. The user terminal employs two predefined channel resources $n_{2OS\text{-}sPUCCH,0}^{(1,\tilde{p})}$, and the $n_{2OS\text{-}sPUCCH,1}^{(1,\tilde{p})}$ determines a predefined sequence sent on each symbol. Specifically, when the ACK is sent, the predefined sequence on the first symbol is calculated by $n_{2OS\text{-}sPUCCH,0}^{(1,\tilde{p})}$, and the cyclic shift amount of the predefined sequence is $\alpha_{\tilde{p}}^{ACK}(n_s, n_{sl}=0, 1)$ in the figure. The predefined sequence sent on the second symbol is obtained by performing randomized mapping on the predefined sequence of the first symbol, and the adopted cyclic shift amount is $\alpha_{\tilde{p}}^{ACK}(n_s, n_{sl}=1, 1+1)$ in the figure. Likewise, when the ACK is sent, the predefined sequence on the first symbol is calculated by $n_{2OS\text{-}sPUCCH,1}^{(1,\tilde{p})}$, and the cyclic shift amount of the predefined sequence is $\alpha_{\tilde{p}}^{NACK}(n_s, n_{sl}=0, 1)$ in the figure; the predefined sequence sent on the second symbol is obtained by performing randomized mapping on the predefined sequence of the first symbol, and the adopted cyclic shift amount is $\alpha_{\tilde{p}}^{NACK}(n_s, n_{sl}=1, 1+1)$ in the figure. Where, the $n_s$ is a time slot index, the $n_{sl}$ is an index for two frequency hopping positions, and the l is a symbol index.

In the figure, the $n_{PRB}$ is a PRB index, each PRB includes 12 subcarriers, the length of the predefined sequence is 12, and M is a shortened resource block index.

Figure 12:
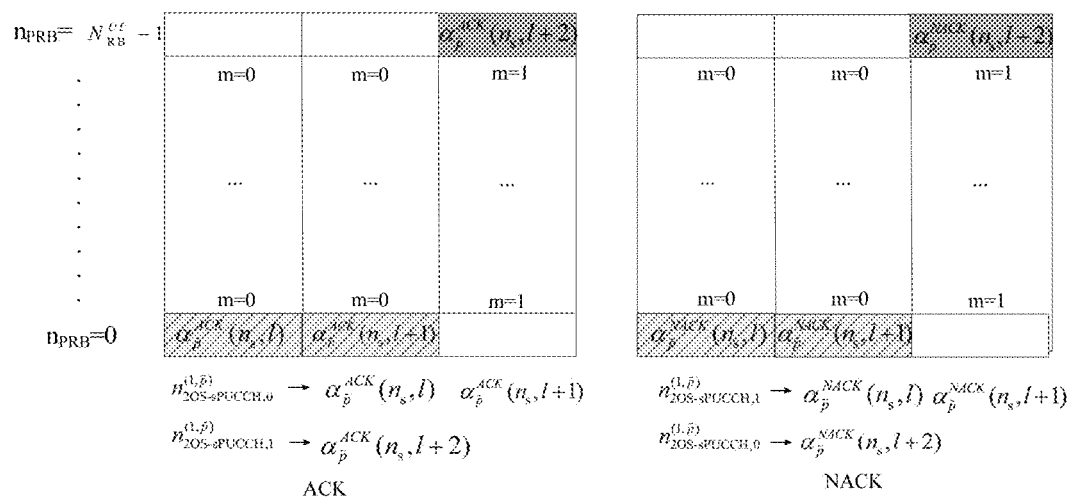
FIG. 12 is a schematic diagram, in which a user terminal sends a 1-bit ACK/NACK on three symbols, in an embodiment of the disclosure.

FIG. 12 is a schematic diagram, in which a user terminal sends a 1-bit ACK/NACK on three symbols, in an embodiment of the disclosure. The user terminal employs two predefined channel resources $n_{2OS\text{-}sPUCCH,0}^{(1,\tilde{p})}$, and the $n_{2OS\text{-}sPUCCH,1}^{(1,\tilde{p})}$ determines a predefined sequence sent on each symbol. Specifically, when the ACK is sent, the predefined sequence on the first symbol and the second symbol at a frequency domain position having a PRB index being 0 is calculated by $n_{2OS\text{-}sPUCCH,0}^{(1,\tilde{p})}$, and the cyclic shift amount of the predefined sequence is $\alpha_{\tilde{p}}^{ACK}(n_s, 1)$, $\alpha_{\tilde{p}}^{ACK}(n_s, l+1)$ in the figure. The predefined sequence on the third symbol at a frequency domain position having a PRB index being $N_{RB}^{UL}-1$ is calculated by $n_{2OS\text{-}sPUCCH,1}^{(1,\tilde{p})}$, and the cyclic shift amount is $\alpha_{\tilde{p}}^{ACK}(n_s, l+2)$ in the figure. Likewise, when the NACK is sent, the predefined sequence on the first symbol and the second symbol at the frequency domain position having the PRB index being 0 is calculated by $n_{2OS\text{-}sPUCCH,1}^{(1,\tilde{p})}$, and the cyclic shift amount of the predefined sequence is $\alpha_{\tilde{p}}^{NACK}(n_s, 1)$, $\alpha_{\tilde{p}}^{NACK}(n_s, l+1)$ in the figure. The predefined sequence on the third symbol at the frequency domain position having the PRB index being $N_{RB}^{UL}-1$ is calculated by $n_{2OS\text{-}sPUCCH,0}^{(1,\tilde{p})}$, and the cyclic shift amount is $\alpha_{\tilde{p}}^{NACK}(n_s, l+2)$ in the figure. Where, the $n_s$ is a time slot index, and the l is a symbol index.

In the figure, the $n_{PRB}$ is a PRB index, each PRB includes 12 subcarriers, the length of the predefined sequence is 12, and M is a shortened resource block index.

Figure 13:
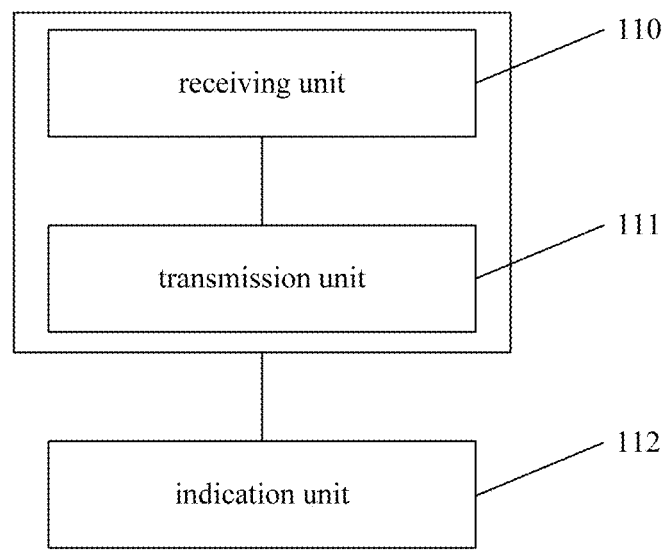
FIG. 13 is a structural schematic diagram of a device for uplink control signal transmission in an embodiment of the disclosure.

FIG. 13 is a structural schematic diagram of a device for uplink control signal transmission in an embodiment of the disclosure. As shown in FIG. 13, the device for uplink control signal transmission in this embodiment of the disclosure includes a receiving unit 110 and a transmission unit 111.

The receiving unit 110 is configured to receive corresponding frequency domain positions or predefined sequences configured by a network side for user terminals to avoid interference among different user terminals in a network cell, the network side being capable of configuring different frequency domain positions or different predefined sequences for the different user terminals.

The transmission unit 111 is configured to send K predefined sequences on M transmission symbols in a TTI to send B-bit uplink control information.

Herein M is a positive integer, K is an integer, $1 \le K \le 2^B$, B is an integer greater than or equal to 1, one of the K predefined sequences is sent on each of the M transmission symbols, the predefined sequences have a length of N and are mapped to N subcarriers of corresponding transmission symbols, N=2n with n being a positive integer.

In this embodiment of the disclosure, at most M different frequency domain positions are provided on the M transmission symbols, and a number of subcarriers contained at any of the frequency domain positions is a multiple of N.

The N subcarriers are continuously mapped or equidistantly mapped to each of the frequency domain positions.

The predefined sequences include but are not limited to: a Zadoff-Chu (ZC) sequence having a length of N, or a frank sequence having a length of N, or a Gray sequence having a length of N, or a Chu sequence having a length of N or a computer generated sequence having a length of N; or a sequence obtained by performing time domain cyclic shift according to the sequence.

The method further includes the following operations.

The user terminal indicates the uplink control information using combinations of the K different predefined sequences sent on different time domain symbols of M transmission symbols.

The K predefined sequences are determined by X predefined channel resources, and X is a positive integer.

The channel resources are determined by at least one of the following information:

a DCI dynamic indication, a high-level configuration and DCI joint indication, an implicit indication, or a joint indication of the DCI dynamic indication and the implicit indication.

When different control information is sent, predefined sequences sent on each symbol are determined by different predefined channel resources.

The uplink control information includes an ACK and an NACK.

It is assumed that the ACK corresponds to a bit "1" and the NACK corresponds to a bit "0", when the ACK or the NACK is sent, the ACK or the NACK is respectively indicated by different predefined sequences sent on each transmission symbol.

The uplink control information includes the ACK and the NACK.

It is assumed that the ACK corresponds to a bit "1" and the NACK corresponds to a bit "0", when the ACK or the NACK is sent, the ACK or the NACK is respectively indicated by predefined sequences being mapped to different frequency domain subcarrier positions on the transmission symbols.

The ACK or NACK message is of 1 or 2 bits.

When the sent information is the 1-bit ACK or NACK, two predefined channel resources are defined respectively as a first predefined channel resource and a second predefined channel resource.

When the 1-bit ACK is sent, predefined sequences sent on each symbol are all determined by the first predefined channel resource.

When the 1-bit NACK is sent, predefined sequences sent on each symbol are all determined by the second predefined channel resource.

When the sent information is a 2-bit ACK or NACK, four predefined channel resources are defined, and the four sent control information combinations includes (ACK, ACK), (ACK, NACK), (NACK, ACK) and (NACK, NACK) in one-to-one correspondence with the four predefined channel resources.

The number of sending antenna ports is one.

When the number of sending antenna ports is a positive integer A, the defined number of predefined channel resources is A*2B.

For each transmission, the predefined sequences sent on each transmission symbol include at least one of the following characteristics:

cell-level randomization or user-level randomization is present among the predefined sequences sent on the each transmission symbol; and a random mapping process is present among predefined sequences of symbols at different frequency domain positions.

The channel resources include at least one of the following characteristics:

when $\Delta_{shift}^{PUCCH}=1$ or 2, $|n_{sPUCCH,i}^{(1,\tilde{p})} - n_{PUCCH}^{(1,\tilde{p})}| \mod N_{sc}^{RB} \neq 0$;

when $\Delta_{shift}^{PUCCH}=3$, $n_{sPUCCH,i}^{(1,\tilde{p})} \neq n_{PUCCH}^{(1,\tilde{p})}$;

or $\Delta_{shift}^{PUCCH}=1$ or 2 or 3, $|n_{sPUCCH,i}^{(1,\tilde{p})} - n_{PUCCH}^{(1,\tilde{p})}| \mod N_{sc}^{RB} \neq 0$.

Where, the $n_{sPUCCH,i}^{(1,\tilde{p})}$ is predefined channel resources distributed to the sent control information, the $n_{PUCCH}^{(1,\tilde{p})}$ is channel resources with an LTE PUCCH format of 1/1a/1b, and the $N_{sc}^{RB}$ is a number of subcarriers in a resource block.

On the basis of the device for uplink control signal transmission as shown in FIG. 13, the device further includes an indication unit.

The indication unit (not shown in FIG. 13) is configured to indicate the uplink control information using combinations of the K different predefined sequences sent on different time domain symbols of M transmission symbols.

In this embodiment of the disclosure, it is assumed that the ACK corresponds to a bit "1", the NACK corresponds to a bit "0" and K=2, when the ACK or the NACK is sent, the ACK or the NACK is respectively indicated by different predefined sequences sent on each transmission symbol.

In this embodiment of the disclosure, the frequency domain positions on different transmission symbols, to which the predefined sequences are mapped, are the same or are not completely the same.

When M is smaller than or equal to 7, the frequency domain positions on the different transmission symbols, to which the predefined sequences are mapped, are at two sides of a system bandwidth.

In this embodiment of the disclosure, it is assumed that the ACK corresponds to a bit "1", the NACK corresponds to a bit "0" and the K=1, when the ACK or the NACK is sent, the ACK or the NACK is respectively indicated by predefined sequences being mapped to different frequency domain subcarrier positions on the transmission symbols.

In this embodiment of the disclosure, the positions on the transmission symbols, to which the predefined sequences are mapped, are at two sides of a system bandwidth.

In this embodiment of the disclosure, it is assumed that the ACK corresponds to a bit "1" and the NACK corresponds to a bit "0", and when the 2-bit ACK/NACK is sent and a number of the predefined sequences is K=1, 2 or 4, each symbol is configured with one frequency domain position, there are $$\frac{4}{K}$$

different subcarrier configurations at the frequency domain position, and each configuration includes N different subcarriers.

The frequency domain positions on different transmission symbols, to which the predefined sequences are mapped, are the same or are not completely the same.

In this embodiment of the disclosure, when K=4, predefined sequences corresponding to the sent "00", "01", "10" and "11" and sent on each transmission symbol are different.

When K=2, the frequency domain position on each transmission symbol is configured with two subcarrier positions; and when the "00", "01", "10" and "11" are sent, different predefined sequences are sent correspondingly on each transmission symbol, or the predefined sequences occupy different subcarrier positions on the transmission symbols.

When K=1, the frequency domain position on each transmission symbol is configured with four subcarrier positions; and when the "00", "01", "10" and "11" are sent, different subcarrier positions are occupied correspondingly on each transmission symbol.

In this embodiment of the disclosure, when M=2 and the 1-bit ACK/NACK is sent, N=4, K=2.

In this embodiment of the disclosure, the two predefined sequences are defined as a first predefined sequence and a second predefined sequence. It is assumed that the ACK corresponds to a bit "1" and the NACK corresponds to a bit "0", the first predefined sequence and the second predefined sequence are mapped to two different time domain symbol positions in the TTI; and when an ACK message is sent, the first predefined sequence is sent on the first symbol and the second predefined sequence is sent on the second symbol; when an NACK message is sent, the second predefined sequence is sent on the first symbol and the first predefined sequence is sent on the second symbol;

or, when the ACK message is sent, the two symbols both send the first predefined sequence; and when the NACK message is sent, the two symbols both send the second predefined sequence.

In this embodiment of the disclosure, the frequency domain positions where the first predefined sequence and the second predefined sequence are located on each time domain symbol are different.

In this embodiment of the disclosure, the first predefined sequence and the second predefined sequence are at two sides of a system bandwidth.

In this embodiment of the disclosure, when M=2 and the 2-bit ACK/NACK is sent, N=4, K=4, or N=4, K=2.

In this embodiment of the disclosure, when N=4, K=4, the four predefined sequences are respectively defined as a first predefined sequence, a second predefined sequence, a third predefined sequence and a fourth predefined sequence.

Sending the 2-bit ACK/NACK includes:

the four predefined sequences are mapped to two different time domain symbol positions in the TTI, and the 2-bit control information is indicated using different combinations of different predefined sequences on different time domain symbols.

In this embodiment of the disclosure, when the "0, 0" is sent, the first predefined sequence is sent on the first symbol and the second predefined sequence is sent on the second symbol; when the "0, 1" is sent, the second predefined sequence is sent on the first symbol and the first predefined sequence is sent on the second symbol; when the "1, 0" is sent, the third predefined sequence is sent on the first symbol and the fourth predefined sequence is sent on the second symbol; and when the "1, 1" is sent, the fourth predefined sequence is sent on the first symbol and the third predefined sequence is sent on the second symbol;

or, when the "0, 0" is sent, the first predefined sequence is sent on both symbols; when the "0, 1" is sent, the second predefined sequence is sent on both symbols; when the "1, 0" is sent, the third predefined sequence is sent on both symbols; and when the "1, 1" is sent, the fourth predefined sequence is sent on both symbols.

In this embodiment of the disclosure, the frequency domain positions where the predefined sequences are located on each time domain symbol are different.

In this embodiment of the disclosure, the first predefined sequence and the second predefined sequence are at two sides of a system bandwidth.

In this embodiment of the disclosure, when N=4, K=2, the two predefined sequences are respectively defined as a first predefined sequence and a second predefined sequence.

The first symbol is provided with a first frequency domain position. Two subcarrier positions that respectively are a first subcarrier position and a second subcarrier position are provided in the first frequency domain position. The second symbol is provided with a second frequency domain position. Two subcarrier positions that respectively are a third subcarrier position and a fourth subcarrier position are provided in the second frequency domain position.

In this embodiment of the disclosure, the subcarrier positions are equidistant discrete subcarriers, or continuous N subcarriers.

In this embodiment of the disclosure, when the "0, 0" is sent, the first predefined sequence is sent on the first symbol and is mapped to the first subcarrier position and the second predefined sequence is sent on the second symbol and is mapped to the third subcarrier position; when the "0, 1" is sent, the first predefined sequence is sent on the first symbol and is mapped to the second subcarrier position and the second predefined sequence is sent on the second symbol and is mapped to the fourth subcarrier position; when the "1, 0" is sent, the second predefined sequence is sent on the first symbol and is mapped to the first subcarrier position and the first predefined sequence is sent on the second symbol and is mapped to the third subcarrier position; and when the "1, 1" is sent, the second predefined sequence is sent on the first symbol and is mapped to the second subcarrier position and the first predefined sequence is sent on the second symbol and is mapped to the fourth subcarrier position.

In this embodiment of the disclosure, the first frequency domain position and the second frequency domain position are at two sides of the system bandwidth.

In this embodiment of the disclosure, when M=3 and the 1-bit ACK/NACK is sent, N=4, K=2, or N=4, K=3.

In this embodiment of the disclosure, when N=4, K=2, the two predefined sequences are defined as a first predefined sequence and a second predefined sequence.

Sending the 1-bit ACK/NACK includes:

the 1-bit control information is indicated using different combinations of the different predefined sequences sent on three different time domain symbols.

In this embodiment of the disclosure, when the ACK is sent, the first predefined sequence is sent on the first symbol, the second predefined sequence is sent on the second symbol, and the first predefined sequence is sent on the third symbol.

When the NACK is sent, the second predefined sequence is sent on the first symbol, the first predefined sequence is sent on the second symbol, and the second predefined sequence is sent on the third symbol.

In this embodiment of the disclosure, the frequency domain positions where the predefined sequences are located on each time domain symbol are different.

In this embodiment of the disclosure, three frequency domain positions where the predefined sequences are located on each time domain symbol are uniformly distributed in a bandwidth of the whole system.

In this embodiment of the disclosure, when M=3 and the 2-bit ACK/NACK is sent, N=4, K=4, or N=4, K=2.

In this embodiment of the disclosure, when N=4, K=4, the four predefined sequences are respectively defined as a first predefined sequence, a second predefined sequence, a third predefined sequence and a fourth predefined sequence.

Sending the 2-bit ACK/NACK includes:

the four predefined sequences are mapped to three different time domain symbol positions in the TTI, and the 3-bit control information is indicated using different combinations of different predefined sequences on different time domain symbols.

In this embodiment of the disclosure, when "00", "01", "10" and "11" are sent, different predefined sequences on each transmission symbol are sent correspondingly.

In this embodiment of the disclosure, when the "0, 0" is sent, the first predefined sequence is sent on the first symbol, the fourth predefined sequence is sent on the second symbol and a third predefined sequence is sent on the third symbol; when the "0, 1" is sent, the second predefined sequence is sent on the first symbol, the first predefined sequence is sent on the second symbol, and the fourth predefined sequence is sent on the third symbol; when the "1, 0" is sent, the third predefined sequence is sent on the first symbol, the second predefined sequence is sent on the second symbol, and the first predefined sequence is sent on the third symbol; and when the "1, 1" is sent, the fourth predefined sequence is sent on the first symbol, the third predefined sequence is sent on the second symbol and the second predefined sequence is sent on the third symbol.

In this embodiment of the disclosure, when N=4, K=2, the two predefined sequences are respectively defined as a first predefined sequence and a second predefined sequence. The first symbol is provided with a frequency domain position, which is first, second and third frequency domain position respectively. And then, two subcarrier positions are provided in each frequency domain position.

The two predefined sequences are mapped to different subcarrier positions at different frequency domain positions of three different time domain symbols in the TTI, and the 2-bit control information is indicated using different mapping combinations.

In this embodiment of the disclosure, when M=4 and the 1-bit ACK/NACK is sent, N=4, K=2.

The two predefined sequences are defined as a first predefined sequence and a second predefined sequence.

Sending the ACK/NACK includes:

the 1-bit control information is indicated using different combinations of the different predefined sequences sent on four different time domain symbols.

In this embodiment of the disclosure, when an ACK message is sent, the first predefined sequence is sent on the first symbol, the second predefined sequence is sent on the second symbol, the first predefined sequence is sent on the third symbol and the second predefined sequence is sent on the fourth symbol; and when an NACK is sent, the second predefined sequence is sent on the first symbol, the first predefined sequence is sent on the second symbol, the second predefined sequence is sent on the third symbol and the fourth sends the first predefined sequence.

In this embodiment of the disclosure, the frequency domain positions where the predefined sequences are located on each time domain symbol are different.

In this embodiment of the disclosure, the frequency domain positions where the predefined sequences are located on each time domain symbol are all different, and the four frequency domain positions are uniformly distributed in the bandwidth of the whole system;

or the frequency domain positions where the predefined sequences are located on first and second time domain symbols are the same, the frequency domain positions on third and fourth time domain symbols are the same, and the frequency domain positions where the four symbols are located are not completely the same.

In this embodiment of the disclosure, when M=4 and the 2-bit ACK/NACK is sent, N=4, K=4.

The four predefined sequences are respectively defined as a first predefined sequence, a second predefined sequence, a third predefined sequence and a fourth predefined sequence.

Sending the ACK/NACK includes:

the four predefined sequences are mapped to four different time domain symbol positions in the TTI, and the 2-bit control information is indicated using different combinations of different predefined sequences on different time domain symbols.

In this embodiment of the disclosure, when "00", "01", "10" and "11" are sent, different predefined sequences on each transmission symbol are sent correspondingly.

In this embodiment of the disclosure, when the "0, 0" is sent, the first, second, third and fourth predefined sequences are sent in sequence on the first, second, third and fourth symbols; when the "0, 1" is sent, the second, third, fourth and first predefined sequences are sent in sequence on the first, second, third and fourth symbols; when the "1, 0" is sent, the third, fourth, first and second predefined sequences are sent in sequence on the first, second, third and fourth symbols; and when the "1, 1" is sent, the fourth, first, second and third predefined sequences are sent in sequence on the first, second, third and fourth symbols.

In this embodiment of the disclosure, when the user terminal sends an SR, K=1, 2 or 4. The condition when the SR is sent will be described below.

In this embodiment of the disclosure, when K=1, the predefined sequence is sent on each of the M symbols.

When K=2, the two predefined sequences are respectively defined as an SR first predefined sequence and an SR second predefined sequence. When the SR is sent individually, either of the two predefined sequences is sent on each symbol, and different predefined sequences are sent on different symbols. Particularly, when M=2, the SR first predefined sequence is sent on the first symbol and the SR second predefined sequence is sent on the second symbol.

In this embodiment of the disclosure, when the SR is multiplexed with the ACK/NACK, the ACK/NACK is sent using the two predefined sequences of the SR.

When M=2 and the SR is multiplexed with the 1-bit ACK/NACK, if the SR and the ACK are sent simultaneously, the SR first predefined sequence is sent on the first symbol and the SR second predefined sequence is sent on the second symbol. If the SR and the NACK are sent simultaneously, the SR second predefined sequence is sent on the first symbol and the SR first predefined sequence is sent on the second symbol.

In this embodiment of the disclosure, when K=4, the four predefined sequences are respectively defined as SR first, second, third and fourth predefined sequences. When the SR is sent individually, one of the four predefined sequences is sent on each symbol, and different predefined sequences are sent on different symbols.

In this embodiment of the disclosure, when the SR is multiplexed with the ACK/NACK, the ACK/NACK is sent using the four predefined sequences of the SR.

In this embodiment of the disclosure, under a condition in which M=2 and the SR is multiplexed with the 2-bit ACK/NACK, when the SR and "0, 0" are sent simultaneously, the SR first predefined sequence is sent on the first symbol and the SR second predefined sequence is sent on the second symbol; if the SR and "0, 1" are sent simultaneously, the SR second predefined sequence is sent on the first symbol and the SR first predefined sequence is sent on the second symbol; if SR and "1, 0" are sent simultaneously, the SR third predefined sequence is sent on the first symbol and the SR fourth predefined sequence is sent on the second symbol; and SR and "1, 1" are sent simultaneously, the SR fourth predefined sequence is sent on the first symbol and the SR third predefined sequence is sent on the second symbol.

In this embodiment of the disclosure, the frequency domain positions where the predefined sequences are located on each time domain symbol may be the same or not completely the same.

In this embodiment of the disclosure, when M=2, the frequency domain positions where the predefined sequences are located on each time domain symbol are different and are at two sides of a system bandwidth. When M=3, the frequency domain positions where the predefined sequences are located on each time domain symbol are all different, and the three frequency domain positions are uniformly distributed in the bandwidth of the whole system. When M=4, the frequency domain positions where the predefined sequences are located on each time domain symbol are all different, and the four frequency domain positions are uniformly distributed in the bandwidth of the whole system; or the frequency domain positions where the predefined sequences are located on first and second time domain symbols are the same, the frequency domain positions on third and fourth time domain symbols are the same, and the frequency domain positions where the four symbols are located are not completely the same.

A person skilled in the art should understand that an implementation function of each unit in a device for uplink control signal transmission shown in FIG. 13 may be comprehended by referring to relevant description on the above method for uplink control signal transmission. A function of each unit in a device for uplink control signal transmission shown in FIG. 13 may be implemented by operating a program on a processor, and may also be implemented via a specific logic circuit.

Figure 14:
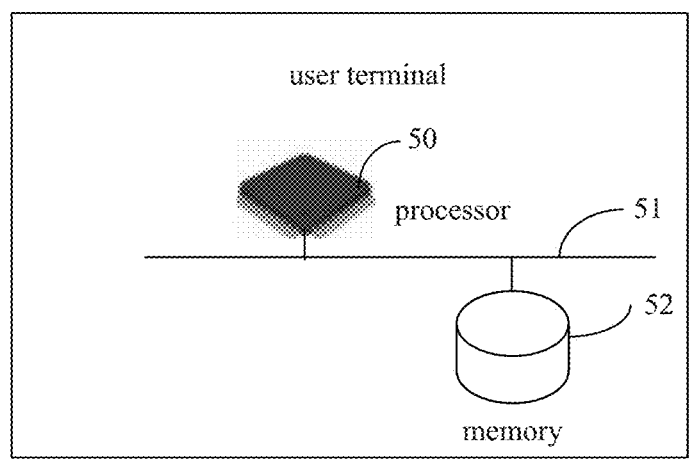
FIG. 14 is a structural schematic diagram of a user terminal in an embodiment of the disclosure.

FIG. 14 is a structural schematic diagram of a user terminal in an embodiment of the disclosure. As shown in FIG. 14, the user terminal in this embodiment of the disclosure includes a controller 50 and a memory 52. The controller 50 and the memory 52 are connected by an address and control bus 51. Various control programs and application programs are stored in the controller 52, so as to control relevant hardware and finish signal information processing, information input and output, etc. The controller 50 executes the following processing by invoking the control programs and the application programs: sending K predefined sequences on M transmission symbols in a TTI to send B-bit uplink control information, herein M is a positive integer, K is an integer, $1 \leq K \leq 2^B$, B is an integer greater than or equal to 1, one of the K predefined sequences is sent on each of the M transmission symbols, the predefined sequences have a length of N and are mapped to N subcarriers of corresponding transmission symbols, N=2n with n being a positive integer.

In this embodiment of the disclosure, at most M different frequency domain positions are provided on the M transmission symbols, and a number of subcarriers contained at any of the frequency domain positions is a multiple of N.

The N subcarriers are continuously mapped or equidistantly mapped to each of the frequency domain positions.

The predefined sequences include but are not limited to: a Zadoff-Chu (ZC) sequence having a length of N, or a frank sequence having a length of N, or a Gray sequence having a length of N, or a Chu sequence having a length of N or a computer generated sequence having a length of N; or a sequence obtained by performing time domain cyclic shift according to the sequence.

The controller 50 further executes the following processing by invoking the control programs and the application programs:

indicating the uplink control information using combinations of the K different predefined sequences sent on different time domain symbols of M transmission symbols.

In this embodiment of the disclosure, the K predefined sequences are determined by X predefined channel resources, and X is a positive integer.

The channel resources are determined by at least one of the following information:

a DCI dynamic indication, a high-level configuration and DCI joint indication, an implicit indication, or a joint indication of the DCI dynamic indication and the implicit indication.

The controller 50 further executes the following processing by invoking the control programs and the application programs: when different uplink control information is sent, determining a predefined sequence on each symbol by different predefined channel resources.

The uplink control information includes an ACK and an NACK.

It is assumed that the ACK corresponds to a bit "1" and the NACK corresponds to a bit "0", when the ACK or the NACK is sent, the ACK or the NACK is respectively indicated by different predefined sequences sent on each transmission symbol.

The uplink control information includes the ACK and the NACK.

It is assumed that the ACK corresponds to a bit "1" and the NACK corresponds to a bit "0", when the ACK or the NACK is sent, the ACK or the NACK is respectively indicated by predefined sequences being mapped to different frequency domain subcarrier positions on the transmission symbols.

The ACK or NACK message is of 1 or 2 bits.

When the sent information is the 1-bit ACK or NACK, two predefined channel resources are defined respectively as a first predefined channel resource and a second predefined channel resource.

When the 1-bit ACK is sent, predefined sequences sent on each symbol are all determined by the first predefined channel resource.

When the 1-bit NACK is sent, predefined sequences sent on each symbol are all determined by the second predefined channel resource.

When the sent information is a 2-bit ACK or NACK, four predefined channel resources are defined, and the four sent control information combinations includes (ACK, ACK), (ACK, NACK), (NACK, ACK) and (NACK, NACK) in one-to-one correspondence with the four predefined channel resources.

The number of sending antenna ports is 1.

When the number of sending antenna ports is a positive integer A, the defined number of predefined channel resources is $A*2^B$.

For each transmission, the predefined sequences sent on each transmission symbol include at least one of the following characteristics:

cell-level randomization or user-level randomization is present among the predefined sequences sent on the each transmission symbol; and a random mapping process is present among predefined sequences of symbols at different frequency domain positions.

The channel resources include at least one of the following characteristics:

when $\Delta_{shift}^{PUCCH}=1$ or 2, $|n_{sPUCCH,i}^{(1,\tilde{p})} - n_{PUCCH}^{(1,\tilde{p})}|$ $\mod N_{sc}^{RB} \neq 0$;

when $\Delta_{shift}^{PUCCH}=3$, $n_{sPUCCH,i}^{(1,\tilde{p})} \neq n_{PUCCH}^{(1,\tilde{p})}$;

Where the $n_{s,PUCCH,i}^{(1,\tilde{p})}$ is predefined channel resources distributed for the sent control information, the $n_{PUCCH}^{(1,\tilde{p})}$ is channel resources with an LTE PUCCH format of 1/1a/1b, and the $N_{sc}^{RB}$ is a number of subcarriers in a resource block.

The frequency domain positions on different transmission symbols, to which the predefined sequences are mapped, are the same or are partially the same.

When M is smaller than or equal to 7, the frequency domain positions on the different transmission symbols, to which the predefined sequences are mapped, are at two sides of a system bandwidth.

The uplink control information includes the ACK and the NACK.

It is assumed that the ACK corresponds to a bit "1" and the NACK corresponds to a bit "0", and when the 2-bit ACK/NACK is sent and a number of the predefined sequences is K=1, 2 or 4, each symbol is configured with one frequency domain position, there are $$\frac{4}{K}$$

different subcarrier configurations at the frequency domain position, and each configuration includes N different subcarriers.

The frequency domain positions on different transmission symbols, to which the predefined sequences are mapped, are the same or are not completely the same.

When K=4 and the "00", "01", "10" and "11" are sent, predefined sequences sent correspondingly on each transmission symbol are different.

When K=2, the frequency domain position on each transmission symbol is configured with two subcarrier positions; and when the "00", "01", "10" and "11" are sent, different predefined sequences are sent correspondingly on each transmission symbol, or the predefined sequences occupy different subcarrier positions on the transmission symbols.

When K=1, the frequency domain position on each transmission symbol is configured with four subcarrier positions; and when the "00", "01", "10" and "11" are sent, different subcarrier positions are occupied correspondingly on each transmission symbol.

The uplink control information includes an SR, the ACK and the NACK.

When the user terminal sends an SR, K=1, 2 or 4.

When K=1, the predefined sequence is sent on each of the M symbols.

When K=2, the two predefined sequences are respectively defined as an SR first predefined sequence and an SR second predefined sequence. When the SR is sent individually, either of the two predefined sequences is sent on each symbol, and different predefined sequences are sent on different symbols. Particularly, when M=2, the SR first predefined sequence is sent on the first symbol and the SR second predefined sequence is sent on the second symbol.

When the SR is multiplexed with the ACK/NACK, the ACK/NACK is sent using the predefined sequences of the SR.

When M=2 and the SR is multiplexed with the ACK/NACK, if the SR and the ACK are sent simultaneously, the SR first predefined sequence is sent on the first symbol and the SR second predefined sequence is sent on the second symbol. If the SR and the NACK are sent simultaneously, the SR second predefined sequence is sent on the first symbol and the SR first predefined sequence is sent on the second symbol.

When K=4, the four predefined sequences are respectively defined as SR first, second, third and fourth predefined sequences. When the SR is sent individually, one of the four predefined sequences is sent on each symbol, and different predefined sequences are sent on different symbols.

In this embodiment of the disclosure, when the sent information is a 1-bit ACK or NACK, two predefined channel resources are defined respectively as a first predefined channel resource and a second predefined channel resource; and when the predefined sequences are sent at two frequency domain positions that are defined respectively as a first frequency domain position and a second frequency domain position.

When the 1-bit ACK is sent, predefined sequences sent on each symbol at the first frequency domain position are all determined by the first predefined channel resource, and predefined sequences sent on each symbol at the second frequency domain position are all determined by the second predefined channel resource.

When the 1-bit NACK is sent, predefined sequences sent on each symbol of the first frequency domain position are all determined by the second predefined channel resource. Predefined sequences sent on each symbol of the second frequency domain position are all determined by the first predefined channel resource.

In this embodiment of the disclosure, when the sent information is the 2-bit ACK or NACK, four predefined channel resources are defined respectively as first, second, third and fourth predefined channel resources. The four sent control information combinations includes: (ACK, ACK), (ACK, NACK), (NACK, ACK) and (NACK, NACK).

When the (ACK, ACK) is sent, predefined sequences sent on each symbol at the first frequency domain position are all determined by the first predefined channel resource, and predefined sequences sent on each symbol at the second frequency domain position are all determined by the second predefined channel resource.

When the (ACK, NACK) is sent, predefined sequences sent on each symbol at the first frequency domain position are all determined by the second predefined channel resource, and predefined sequences sent on each symbol at the second frequency domain position are all determined by the first predefined channel resource.

When the (NACK, ACK) is sent, predefined sequences sent on each symbol at the first frequency domain position are all determined by the third predefined channel resource, and predefined sequences sent on each symbol at the second frequency domain position are all determined by the fourth predefined channel resource.

When the (NACK, NACK) is sent, predefined sequences sent on each symbol at the first frequency domain position are all determined by the fourth predefined channel resource, and predefined sequences sent on each symbol at the second frequency domain position are all determined by the third predefined channel resource.

An embodiment of the disclosure further provides a storage medium; a computer program is stored in the storage medium; and the computer program executes the above method for uplink control signal transmission in the above embodiment when being invoked by a processor.

In several embodiments provided by the application, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit. The integrated unit may be implemented in a hardware form, and may also be implemented in form of hardware and software function unit.

Those skilled in the art should know that: all or part of the operations of the above-mentioned method embodiment may be implemented by instructing related hardware through a program, the above-mentioned program may be stored in a computer-readable storage medium, and the program is executed to execute the operations of the above-mentioned method embodiment; and the storage medium includes: various media capable of storing program codes such as mobile storage equipment, a Read-Only Memory (ROM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The above-mentioned storage medium includes: various media capable of storing program codes such as mobile storage equipment, a ROM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for uplink control signal transmission, comprising: sending, by a user terminal, K predefined sequences on M transmission symbols in a Transmission Time Interval (TTI) to send B-bit uplink control information, wherein M is a positive integer, K is an integer, $1<K<2^B$, B is an integer greater than or equal to 1, on each of the M transmission symbols, one of the K predefined sequences is sent and each of the K predefined sequences has a length of N and is mapped to N subcarriers of the transmission symbols corresponding to the each of the K predefined sequences, wherein N=2n with n being a positive integer.

2. The method for uplink control signal transmission of claim 1, wherein at most M different frequency domain positions are provided on the M transmission symbols, and a number of subcarriers contained at any of the frequency domain positions is a multiple of N.

3. The method for uplink control signal transmission of claim 2, wherein the N subcarriers are continuously mapped or equidistantly mapped to each of the frequency domain positions.

4. The method for uplink control signal transmission of claim 1, wherein the predefined sequences comprise: a Zadoff-Chu (ZC) sequence having a length of N, or a frank sequence having a length of N, or a Gray sequence having a length of N, or a Chu sequence having a length of N or a computer generated sequence having a length of N; or
a sequence obtained by performing time domain cyclic shift according to the sequence.

5. The method for uplink control signal transmission of claim 1, further comprising:
indicating, by the user terminal, the uplink control information using combinations of the K different predefined sequences sent on different time domain symbols of the M transmission symbols.

6. The method for uplink control signal transmission of claim 5, wherein the K predefined sequences are determined by X predefined channel resources, and X is a positive integer;
the channel resources are determined by at least one of the following information:
a Downlink Control Information (DCI) dynamic indication, a high-level configuration and DCI joint indication, an implicit indication, or a joint indication of the DCI dynamic indication and the implicit indication.

7. The method for uplink control signal transmission of claim 1, wherein when different uplink control information is sent, one or more the predefined sequences sent on each symbol is determined by different predefined channel resources.

8. The method for uplink control signal transmission of claim 5, wherein the uplink control information comprises an Acknowledgement (ACK) and a Negative Acknowledgement (NACK); wherein the ACK corresponds to a bit "1" and the NACK corresponds to a bit "0", when the ACK or the NACK is sent, the ACK or the NACK is respectively indicated by different predefined sequences sent on each transmission symbol.

9. The method for uplink control signal transmission of claim 5, wherein the uplink control information comprises an ACK and an NACK; wherein the ACK corresponds to a bit "1" and the NACK corresponds to a bit "0", when the ACK or the NACK is sent, the ACK or the NACK is respectively indicated by the predefined sequences being mapped to different frequency domain subcarrier positions on the transmission symbols.

10. The method for uplink control signal transmission of claim 1, wherein when the sent information is a 1-bit ACK or NACK, two predefined channel resources are defined respectively as a first predefined channel resource and a second predefined channel resource; when the 1-bit ACK is sent, the predefined sequences sent on each symbol are all determined by the first predefined channel resource;
when the 1-bit NACK is sent, the predefined sequences sent on each symbol are all determined by the second predefined channel resource.

11. The method for uplink control signal transmission of claim 1, wherein when the sent information is a 2-bit ACK or NACK, four predefined channel resources are defined, and the four sent control information combinations comprise: (ACK, ACK), (ACK, NACK), (NACK, ACK) and (NACK, NACK) in one-to-one correspondence with the four predefined channel resources; and for one of the four sent combinations, the predefined sequences of all symbols in the TTI are all uniquely determined by one corresponding predefined channel resource.

12. The method for uplink control signal transmission of claim 11, wherein for each transmission, the predefined sequences sent on each transmission symbol comprise at least one of the following characteristics:
cell-level randomization or user-level randomization is present among the predefined sequences sent on the each transmission symbol; and
a random mapping process is present among the predefined sequences of symbols at different frequency domain positions.

13. The method for uplink control signal transmission of claim 5, wherein the uplink control information comprises an ACK and an NACK; wherein the ACK corresponds to a bit "1" and the NACK corresponds to a bit "0", and when a 2-bit ACK/NACK is sent and a number of the predefined sequences is K=1, 2 or 4, K each symbol is configured with one frequency domain position, there are—different 4 subcarrier configurations at the frequency domain position, and each configuration comprises N different subcarriers; and the frequency domain positions on different transmission symbols of the M transmission symbols, to which the predefined sequences are mapped, are the same or are not completely the same.

14. The method for uplink control signal transmission of claim 1, wherein the uplink control information comprises a scheduling Request (SR), an ACK and an NACK; and when the user terminal sends the SR, K=1, 2 or 4.

15. The method for uplink control signal transmission of claim 14, wherein when K=1, the predefined sequence is sent on each of the M symbols;
when K=2, the two predefined sequences are respectively defined as an SR first predefined sequence and an SR second predefined sequence; when the SR is sent individually, either of the two predefined sequences is sent on each symbol, and different predefined sequences of the two predefined sequences are sent on different symbols; and particularly, when M=2, the SR first predefined sequence is sent on the first symbol and the SR second predefined sequence is sent on the second symbol.

16. The method for uplink control signal transmission of claim 14, wherein when the SR is multiplexed with the ACK/NACK, the ACK/NACK is sent using the predefined sequences of the SR.

17. The method for uplink control signal transmission of claim 16, wherein when M=2 and the SR is multiplexed with the ACK/NACK, if the SR and the ACK are sent simultaneously, the SR first defined sequence is sent on the first symbol and the SR second predefined sequence is sent on the second symbol; and if the SR and the NACK are sent simultaneously, the SR second defined sequence is sent on the first symbol and the SR first predefined sequence is sent on the second symbol.

18. The method for uplink control signal transmission of claim 14, wherein when K=4, the four predefined sequences are respectively defined as SR first, second, third and fourth predefined sequences; and when the SR is sent individually, one of the four predefined sequences is sent on each symbol, and different predefined sequences of the four predefined sequences are sent on different symbols.

19. The method for uplink control signal transmission of claim 14, wherein the SR predefined sequences are determined by one or two or four predefined channel resources.

20. A device for uplink control signal transmission, comprising: a memory storing processor-executable instructions; and a processor arranged to execute the stored processor-executable instructions to perform steps of: sending K predefined sequences on M transmission symbols in a Transmission Time Interval (TTI) to send B-bit uplink control information, wherein M is a positive integer, K is an integer, $1<K<2^B$, B is an integer greater than or equal to 1, on each of the M transmission symbols, one of the K predefined sequences is sent, and each of the K predefined sequences has a length of N and is mapped to N subcarriers of the corresponding transmission symbols corresponding to the each of the K predefined sequences, wherein N=2n with n being a positive integer.

* * * * *

UNITED STATES PATENT AND TRADEMARK OFFICE
CERTIFICATE OF CORRECTION

PATENT NO. : 10,736,130 B2
APPLICATION NO. : 16/089060
DATED : August 4, 2020
INVENTOR(S) : Xianghui Han et al.

Page 1 of 1

It is certified that error appears in the above-identified patent and that said Letters Patent is hereby corrected as shown below:

In the Claims

In Line 5 of Claim 1 and Line 8 of Claim 20, the phrase "$1<K<2^B$" should be amended to "$1\leq K\leq 2^B$".

Signed and Sealed this
Twenty-second Day of December, 2020

Andrei Iancu
*Director of the United States Patent and Trademark Office*